United States Patent
de Prisco

(10) Patent No.: US 9,140,117 B2
(45) Date of Patent: Sep. 22, 2015

(54) METHOD FOR EVALUATING RELATIVE PERMEABILITY FOR FRACTIONAL MULTI-PHASE, MULTI-COMPONENT FLUID FLOW THROUGH POROUS MEDIA

(75) Inventor: Giuseppe de Prisco, Houston, TX (US)

(73) Assignee: InGrain, Inc., Houston, TX (US)

( * ) Notice: Subject to any disclaimer, the term of this patent is extended or adjusted under 35 U.S.C. 154(b) by 551 days.

(21) Appl. No.: 13/548,339

(22) Filed: Jul. 13, 2012

(65) Prior Publication Data

US 2014/0019053 A1 Jan. 16, 2014

(51) Int. Cl.
- G01N 15/08 (2006.01)
- E21B 49/00 (2006.01)
- G06F 17/50 (2006.01)
- G06T 17/05 (2011.01)

(52) U.S. Cl.
CPC ............ *E21B 49/00* (2013.01); *G06F 17/5009* (2013.01); *G06T 17/05* (2013.01); *G06F 2217/16* (2013.01)

(58) Field of Classification Search
CPC ..... G06T 17/05; E21B 49/00; G06F 17/5009; G06F 2217/16
USPC .......................................................... 702/12
See application file for complete search history.

(56) References Cited

U.S. PATENT DOCUMENTS

| | | | |
|---|---|---|---|
| 2,345,935 A | 4/1944 | Hassler | |
| 4,506,542 A | 3/1985 | Rose | |
| 6,516,080 B1 | 2/2003 | Nur | |
| 8,170,799 B2 * | 5/2012 | Dvorkin et al. | 702/6 |
| 8,331,626 B2 * | 12/2012 | Wojcik et al. | 382/109 |
| 8,583,410 B2 * | 11/2013 | Sisk et al. | 703/10 |
| 8,676,556 B2 * | 3/2014 | Deffenbaugh et al. | 703/10 |
| 8,725,477 B2 * | 5/2014 | Zhang et al. | 703/10 |
| 8,908,925 B2 * | 12/2014 | Hurley et al. | 382/109 |
| 2010/0128932 A1 | 5/2010 | Dvorkin et al. | |
| 2013/0018641 A1 * | 1/2013 | Prisco et al. | 703/9 |

OTHER PUBLICATIONS

International Search Report and Written Opinion issued in corresponding International Patent Application No. PCT/US2013/045531 dated Apr. 17, 2014 (11 pages).

(Continued)

*Primary Examiner* — Sujoy Kundu
*Assistant Examiner* — Xiuquin Sun
(74) *Attorney, Agent, or Firm* — Kilyk & Bowersox, P.L.L.C.

(57) ABSTRACT

A method for computing or estimating relative permeability for fractional multi-phase, multi-component fluid flow through a porous medium, which employs a 3D digital representation of a porous medium and a computational fluid dynamics method to calculate flow rates, pressures, saturations, velocities and other flow parameters, is described. The method employs a unique method which integrates a precursor simulation used to generate a set of variables like pressure, saturation and velocity distribution associated with a selected storage plane in the 3D digital representation of a porous medium, which variables are used as inlet condition in the workflow of a second simulation that can generate values of fractional flow rates, pressures, saturations, velocities, or other parameters of wetting and non-wetting phases, which can be used to compute or estimate relative permeability values or other fluid transport properties of the porous medium. Computerized systems and programs for performing the method are also provided.

20 Claims, 8 Drawing Sheets

(56) References Cited

OTHER PUBLICATIONS

Ramstad et al., "Simulation of Two Phase Flow in Reservoir Rocks Using a Lattice Boltzmann Method," SPE International Oil and Gas Conference and Exhibition, No. SPE124617, Oct. 4, 2009, p. 1-16.

Rose, W., "Some Problems in Applying the Hassler Relative Permeability Method," 32 J. Petroleum Techology, 1161-63 (Jul. 1980).

Gunstensen, A. K., et al., "Lattice-Boltzmann Studies of Immiscible Two-Phase Flow Through Porous Media," J. of Geophysical Research, vol. 98, No. B4, Apr. 10, 1993, pp. 6431-6441.

Naar, J. et al., "Three-Phase Imbibition Relative Permeability," Soc. Pet. Eng. J., 12, pp. 254-258, 1961.

Saraf, D.N., et al., "Three-Phase Relative Permeability Measurement Using a Nuclear Magnetic Resonance Technique for Estimating Fluid Saturation," Soc. Pet. Eng. J., 9, pp. 235-242, Sep. 1967.

Ladd, A. J. C., "Numerical simulations of particulate suspensions via a discretized Boltzmann Equation. Part 1. Theoretical Foundation," J.. Fluid Mech., vol. 271, 1994, pp. 285-309.

Gunstensen, A. K., et al., "Lattice-Boltzmann model of immiscible fluids," Phys. Rev. A., vol. 43, No. 8, Apr. 15, 1991, pp. 4320-4327.

Olson, J. F., et al., "Two-fluid flow in sedimentary rock: simulation, transport and complexity," J. Fluid Mech., vol. 341, 1997, pp. 343-370.

* cited by examiner

METHOD FOR EVALUATING RELATIVE PERMEABILITY FOR FRACTIONAL MULTI-PHASE, MULTI-COMPONENT FLUID FLOW THROUGH POROUS MEDIA

BACKGROUND OF THE INVENTION

The present invention relates to a method to evaluate and estimate relative permeability for fractional multi-phase, multi-component fluid flow through porous media. Relative permeability data estimated with the present method can be used, for example, in many areas such as oil field simulation, estimating oil or gas production rates, estimating recoverable reserves, designing hydrocarbon recovery strategies such as fracturing or "fracking," life sciences, paper manufacturing, food industry, agriculture, and other areas relating to geology and geophysics. The present invention also relates to a computerized system and components thereof for performing such a method.

Relative permeability ("$k_r$") is used to quantify multiphase flow, such as the flow of oil in the presence of water and water in the presence of oil. In a sample with two such fluids, the relative permeabilities $k_{rn}$ and $k_{rw}$, by definition, are given by equations [9] and [10]:

$$k_{rn} = -\frac{Q_n \mu_n}{k_{Absolute}\frac{A d p}{d x}} \quad [9]$$

$$k_{rw} = -\frac{Q_w \mu_w}{k_{Absolute}\frac{A d p}{d x}} \quad [10]$$

where the subscripts "n" and "w" refer to non-wetting fluid and wetting fluid, respectively. The fluxes $Q_n$ and $Q_w$ are measured at fixed saturation $S_w$. Relative permeability is usually plotted versus $S_w$.

The relative permeability depends on more factors than $k_{Absolute}$, including the wettability of the fluids and minerals system, interfacial surface tension, and viscosity contrast between the fluid phases, the velocities of the fluids, the saturation level of the fluid in the pores, the structure and connectivity of the pores in the porous solid and the pore space geometry. Another important factor that influences the relative permeability is the time history of the flows that went through the porous media. These parameters may vary in space and time and the resulting fluid state and composition changes during production of fluids.

In a porous medium, capillary attraction is determined by the adhesion between a liquid present in the body and the body itself and by the cohesive force of the liquid to itself. A liquid that wets a solid surface has greater adhesion to the particular solid than a non-wetting fluid. A fluid may wet one solid and not another solid. In multiphase fluid flow, wettability is a relative property. For example, if the force of adhesion of a first fluid for a porous medium is greater than the force of adhesion of a second fluid for a porous medium, then the first fluid is said to be wetting and the second fluid is said to be non-wetting.

Saturation, $S_x$, is the volume fraction of the total pore volume in a porous medium that is occupied by material "X". The saturation level is a value between 0 and 1. A saturation level of 1 indicates that the entire available pore space in a given porous medium is filled by the fluid under consideration. Relative permeabilities are a function of fluid saturation. As the saturation of a particular phase increases, its relative permeability increases. Saturation history also has a major effect on relative permeability. The relative permeability-saturation relationship exhibits a hysteresis effect between the drainage process (wetting phase decreasing) and imbibition process (non-wetting phase increasing). It is believed that most subterranean porous rock formations were initially water filled and hydrocarbons entered these porous formations displacing part of the water. This history must be reproduced or assessed before any estimation of relative permeability is attempted so that realistic starting conditions are established. Imbibition and drainage plots of relative permeability versus saturation are shown in FIG. 1.

When a porous medium contains two or more immiscible fluids, the local volume of material in any particular pore may be different from the overall or average saturation level for the entire porous rock sample. For example, one fluid may strongly adhere to the surfaces within a given pore while another material may have no effective contact with the solid material. The local pore space geometry within a given porous medium can vary considerably and these variations in geometry can affect local saturation levels.

In practice, relative permeability can be estimated by physical lab tests or by numerical simulations.

One of the early physical lab methods for measuring relative permeability is described in U.S. Pat. No. 2,345,935 (Hassler). The method involves sealing all but two opposing surfaces on a porous rock sample. A fluid or fluids under pressure are introduced into one open surface and forced to flow through the sample at a specified flow rate. Fluid pressures are generated by pumps or similar means. The pressures and flux rates are inputs to the relative permeability calculation. One shortcoming of the Hassler technique is the need to determine internal wetting fluid pressures within the porous medium. This problem is described by W. Rose, "Some Problems in Applying the Hassler Relative Permeability Method," 32 J. Petroleum Technology, 1161-63 (July, 1980). U.S. Pat. No. 4,506,542 (Rose) describes an apparatus and method that does not require measurement of internal pressures for estimation of relative permeability.

The Hassler method is a Steady State Method that can be used to calculate relative permeability versus saturation for a full range of saturations from 0 to 1. For two phase systems of immiscible fluids, the rock sample may first be purged with one fluid for a sufficient time such that the saturation in the rock sample of the selected fluid is 1. Then the other fluid or combinations of the two fluids are forced through the sample for a sufficient time to achieve steady state of the two fluxes $Q_n$ and $Q_w$. At this point, the flux and pressure readings can be used to calculate $k_n$, $k_w$, for a given value of $S_w$, and plotted. The ratio of wetting and non-wetting fluids at the inlet of the sample can then be changed. This new combination of wetting and non-wetting fluids are forced through the sample for a sufficient time to achieve steady state of the two fluxes $Q_n$ and $Q_w$. Another pair of relative permeabilities, $k_n$, $k_w$ corresponding to another value of $S_w$, are calculated and another point is plotted. By repeating this procedure for different combinations of wetting and non-wetting fluids, a graph of relative permeability versus saturation can be plotted as shown in FIG. 2.

Other steady state physical methods to compute relative permeability include the Penn State Method (Snell, R. W., Measurements of gas-phase saturation in a porous medium, J. Inst. Pet., 45 (428), 80, 1959; The Hafford method (Naar, J. et al., Three-phase imbibition relative permeability, Soc. Pet. Eng. J., 12, 254, 1961); the Single-Sample Dynamic Method (Saraf, D. N. et al., Three-phase relative permeability measurement using a nuclear magnetic resonance technique for estimating fluid saturations, Soc. Pet. Eng. J., 9, 235, 1967); the Stationary Fluid Method (Saraf, D. N. et al., Three-phase relative permeability measurement using a nuclear magnetic resonance technique for estimating fluid saturations, Soc. Pet. Eng. J., 9, 235, 1967); and the Dispersed Feed Method (Saraf, D. N. et al., Three-phase relative permeability measurement using a nuclear magnetic resonance technique for estimating fluid saturations, Soc. Pet. Eng. J., 9, 235, 1967).

Another method, the Un-Steady State Method, also begins with the rock sample initially saturated with the wetting fluid. Then the non-wetting fluid is forced through the sample, the fraction of non-wetting fluid recovered and the pressure drop across the sample are recorded and used to calculate various combinations of $k_n$, $k_w$ at corresponding values of $S_w$.

Laboratory methods can suffer from a number of shortcomings, which may include one or more the following:

1. The sample to be tested is in the lab at surface conditions whereas the in-situ sample may be at temperatures above 100° C. and 100-700 bar. When samples are brought to the surface many properties of the rock change. Creating artificial conditions to replicate downhole conditions is difficult, expensive, and/or imprecise.
2. The pressures required to achieve desired flow rates may be extremely high causing leakage problems and/or equipment malfunctions.
3. A large volume of fluid must be processed for the sample to come close to steady state.
4. Tests can take a very long time up to weeks or months or more than a year to complete.
5. Very tight formations such as shales may be difficult or impossible to measure.
6. Initial conditions such as saturation, wettability, and fluid distributions are difficult to establish.
7. Establishing wettability in the lab is difficult because cores are usually cleaned prior to the testing and initial wettability cannot be accurately restored.
8. In the lab, it is difficult and expensive to conduct tests with reservoir fluids at reservoir conditions. Mixing gas and oil at reservoir temperatures and pressures is difficult and can be dangerous.

Numerical simulations to calculate relative permeability typically use numerical methods such as pore network modeling or direct simulation of multi-phase/multi-component flow in a porous medium.

One such general method to compute relative permeability is described in U.S. Pat. No. 6,516,080 (Nur). This method as with most numerical methods relies on production of a digital representation of a porous medium, hereinafter referred to as a "Sample," for which relative permeability is to be estimated. The digital representation is typically produced by a CT X-ray scanner and then refined to compensate for limitations in resolution of the scanner. This representation along with fluid properties, rock properties, initial saturation, wettability, interfacial tension and viscosities are used as input to the lattice Boltzmann algorithm. The Lattice-Boltzmann method is a tool for flow simulation, particularly in media with complex pore geometry. See, for example, Ladd, Numerical Simulations of Particulate Suspensions via a discretized Boltzmann Equation, Part 1: Theoretical Foundation, J. Fluid Mech., v 271, 1994, pp. 285-309; Gunstensen et al., "Lattice Boltzmann Model of Immiscible Fluids, Phys. Rev. A., v. 43, no. 8, Apr. 15, 1991, pp. 4320-4327; Olsen et al., Two-fluid Flow in Sedimentary Rock: Simulation, Transport and Complexity, J. Fluid Mechanics, Vol. 341, 1997, pp. 343-370; and Gustensen et al., Lattice-Boltzmann Studies of Immiscible Two-Phase Flow Through Porous Media," J. of Geophysical Research, V. 98, No. B 4, Apr. 10, 1993, pp. 6431-6441). The Lattice-Boltzmann method simulates fluid motion as collisions of imaginary particles, which are much larger than actual fluid molecules, but wherein such particles show almost the same behavior at a macroscopic scale. The algorithm used in the Lattice-Boltzmann method repeats collisions of these imaginary particles, and provides a distribution of local mass flux.

The accuracy of numerical methods to calculate relative permeability such as the Nur method depends in part on the accuracy of the Sample. The Sample is made up of discrete elements called voxels. Voxels are volumetric pixels. A digital representation of a three-dimensional object can be sub-divided into voxels. Ideally, each voxel is accurately classified as either solid or pore. The choice between solid or pore may not always be clear due to differences in the resolution of the scan and the minimum size of the grains in the porous medium. If a voxel is classified as solid, the nature or composition of the solid also should be known or determined in order to numerically model and make estimates of its physical properties.

In addition, the accuracy of numerical methods to compute relative permeability also depends on the numerical methods applied. The robustness of these methods can depend upon how boundary conditions in the algorithm are handled. There can be inlet and outlet boundary conditions, boundary conditions on the top, bottom, left or right of the sample and boundary conditions on the interior of the porous medium. The latter include effects on wettability especially when relatively small fractional flows of one fluid or the other are present. Boundary conditions are a quite complex problem in numerical methods. Selection of boundary conditions can significantly affect the time required for computation, the accuracy of results and the stability of the simulation. This can be especially true for immiscible multi-phase or multi-component simulations. Difficulties can arise from the fact that the pressure and distribution of the phases and velocities at the inlet of the digital simulation are unknown and these conditions must be established such that they mimic the physical conditions. There is no standardized and unique way of setting appropriate boundary conditions and many authors propose their own solution. The boundary conditions chosen can be of primary importance since they significantly can affect the numerical accuracy of the simulation and also its stability.

Numerical methods can have advantages over laboratory methods, such as in one or more of the following ways.

1. Because numerical simulations are virtual, they do not require the physical presence such as downhole fluids at downhole conditions. In the case of relative permeability in oil and gas formations, hydrocarbons at high temperatures and pressures, often above the critical point, are difficult to control and dangerous to handle.
2. Because numerical simulations can accelerate the time scale used, numerical simulations can be completed in a matter of hours or days instead of weeks, months, or longer. Because of this, more variations in fluid composition and flux can be processed using numerical methods than are practical in lab tests.
3. Numerical simulations have the advantage that the properties of any component can be accurately calculated at any location and at any time.

Numerical methods also may suffer some drawbacks, including one or more of the following:

1. Initial and boundary conditions are difficult or impossible to assess which results in inability in some cases to accurately calculate relative permeabilities or instability in computation. This is especially true when fractional flow of one or more components is small.
2. The distribution of wettability in space and time within a porous medium is difficult to assess.

The present investigator has recognized that there is a need for new methods and systems for simulating fluid flow through porous media to provide, for example, improved evaluations and estimates of relative permeability for fractional multi-phase, multi-component fluid flow through the porous media, and which can provide an improved capability to evaluate and estimate the potential productivity of an oil field or other subterranean reservoir, and/or which may provide improved modeled estimates of fluid flow through other types of porous media or other uses.

SUMMARY OF THE INVENTION

A feature of the present invention is a method to calculate or estimate relative permeability for fractional multi-phase, multi-component fluid flow through porous media.

A further feature of the present invention is a system for computing or determining or estimating relative permeability for fractional multi-phase, multi-component flow through a porous medium that has a scanner capable of producing a three dimensional digital image of a porous medium and a computer operable for segmenting elements in the three dimensional digital image and executing a computer program capable of performing the indicated computations to calculate or estimate relative permeability for fractional multi-phase, multi-component fluid flow through porous media.

Another feature of the present invention is a computer program product on a computer readable medium that, when performed on a controller in a computerized device provides a method for performing one or more or all of the indicated computations.

A further feature of the present invention is a method and/or system of using the calculated or estimated relative permeability to evaluate a subterranean oil reservoir or other type of porous media.

To achieve these and other advantages and in accordance with the purposes of the present invention, as embodied and broadly described herein, the present invention relates, in part, to a method for estimating relative permeability for fractional multi-phase, multi-component fluid flow through a porous medium comprising the steps of (a) creating a three dimensional digital representation of the porous medium ("Sample"); (b) performing a first or precursor simulation over a first computational domain of the three-dimensional (3D) digital representation of the porous medium, wherein the first computational domain extends from an inlet plane to an outlet plane and a selected storage plane is located between the inlet and outlet planes; and (c) performing a second simulation over a second computational domain of the three-dimensional (3D) digital representation of the porous medium sample, wherein the second computational domain is defined by the storage plane which represents an inlet plane for the second computational domain and the same outlet plane used in the precursor simulation, and wherein setting of the inlet conditions of the second simulation comprises use of index values stored on the storage plane at preselected saturation change value occurrences during the precursor simulation. The stored index values can comprise sets of variables which include pressure distribution, saturation distribution, and velocity distribution of the wetting and non-wetting phases. The performing of the first or precursor simulation of step (b) can comprise the steps of (1) setting the initial condition for the precursor simulation where the initial distribution of the fluid can be single or multi-phase flow within the volume; typically a single flow distribution is preferred, (2) defining a nominal pressure at the outlet of the volume, (3) assessing properties of the wetting fluids and non-wetting fluids, (4) defining an inlet pressure in order to have a desired or selected flow rate, which typically can simulate a capillary dominated flow or other regimes as viscous dominated flow, wherein the initial guess of the inlet pressure can be estimated through Darcy's law, (5) simulating the injecting of single phase fluid into the inlet plane of the sample towards the storage plane and the outlet plane; this fluid, in case of initial single fluid distribution inside the sample, is the fluid that is not present in the sample at the beginning of the simulation; in case of multiphase distribution the injected fluid can be one of the two fluids, (6) calculating sets of variables comprising fractional flow rates, pressures, saturations, and velocities of wetting and non-wetting phases for all points in the porous medium within the first computational domain for successive time increments, (7) determining if saturation at the storage plane has changed one of a preselected percentage amounts after the calculating done at each of the time increments of step (6), and if so, storing index values for the storage plane wherein the stored index values comprise sets of variables which comprise the saturations, and/or pressures, and/or velocities of the wetting and/or non-wetting phases of the storage plane measured for the time increment for which this determining step is done, (8) determining after step (7) if saturation in a volume of the porous medium defined by the first computational domain is at quasi steady state, and (9) repeating steps (5), (6), and (7) for a successive time increment if saturation in the volume is not determined to be at quasi steady state in step (8) or ending the simulating of step (5) if quasi steady state is determined in step (8), wherein a last set of stored index values in step (7) are designated final index values. The performing of the second simulation of step (c) can comprise the steps of (i) setting the initial condition for the precursor simulation where the initial distribution of the fluid can be single or multi-phase flow within the volume, (ii) defining a nominal pressure at the outlet of the volume, (iii) setting inlet flow conditions of the second simulation from the storage plane of the precursor simulation, wherein the first plane determines the first fractional flow injection of wetting and non-wetting fluid, (iv) simulating the injecting of dual phase fluids into the inlet plane of the sample of the second simulation towards the outlet plane, wherein fractions of wetting and non-wetting phases are injected according to the saturation and pressure distribution values stored from the precursor simulation at the storage plane, beginning with initial index values of zero for the first couple of fractional flows stored in the precursor simulation, (v) calculating fractional flow rates, pressures, saturations, and velocities of the wetting and non-wetting phases for all points in the porous medium within the second computational domain for a time increment during the simulating of step (iv), (vi) determining after step (v) if a quasi steady state is reached, (vii) repeating steps (v) and (vi) for a successive time increment if quasi steady state is not determined in step (vi), (viii) storing the fractional flow rates, pressure and saturations distribution calculated in step (v) if quasi steady state is determined in step (vi), (ix) determining if the final index values stored for the variables at the storage plane in the precursor simulation have been reached if quasi steady state is determined in step (vi), (x) repeating steps (v), (vi), (vii), and (viii) if determined in step (ix) that the final index values stored for the storage plane in the precursor simulation have not been reached, comprising using inflow conditions for the calculating in step (v) which correspond to successively stored index values for the variables at the storage plane from the precursor simulation, and (xi) calculating relative permeability of at least one of the wetting phase and non-wetting phase if the final index values stored for the variables at the storage plane in the precursor simulation are determined to have been reached in step (ix).

The present invention also relates to a method for estimating relative permeability for fractional multi-phase, multi-component fluid flow through a porous medium comprising the indicated steps (a), (b), and (c), wherein (b) comprises the steps of (1) selecting a storage plane located between and parallel to the inlet and outlet planes in the three-dimensional (3D) digital representation of the porous medium, (2) setting initial conditions of the precursor simulation, wherein the initial conditions comprise initial phases distribution, fluid properties, outlet pressure, and maximum time increments, (3) simulating injecting of single phase fluid into the inlet plane of the sample towards the storage plane and the outlet plane, (4) calculating fractional flow rates, pressures, saturations, and velocities of wetting and non-wetting phases for all points in the porous medium within the first computational domain for a time increment during the simulating of step (3), (5) determining after the calculating of step (4) if saturation at the storage plane has changed a preselected percentage amount, (6) storing the calculated pressures, saturations, and fractional velocities of the storage plane for the time increment as corresponding index values if in step (5) a preselected percentage amount of change in saturation is determined to have occurred, (7) determining after step (5) if saturation in a volume of the porous medium defined by the first computational domain is at quasi steady state, (8) repeating steps (3), (4), (5), and (6) for a successive time increment if saturation in the volume is not determined to be at quasi steady state in step (7) or ending the simulating of step (3) if quasi steady state is determined in step (7), wherein a last set of stored index values in step (6) are designated final index values; and step (c) comprises the steps of (i) setting initial conditions for the second simulation, which comprise outlet pressure, phase distributions, maximum time increments, and the initial index values stored in the precursor simulation, (ii) simulating injecting of dual phase fluids into the porous medium from the storage plane towards the outlet plane, wherein fractions of wetting and non-wetting phases are injected according to the initial index values of the variables stored from the precursor simulation, (iii) calculating fractional flow rates, pressures, saturations, and velocities for all points in the porous medium within the indicated second computational domain for a time increment during the simulating of step (ii), (iv) determining after step (iii) if steady state is reached, (v) repeating steps (iii) and (iv) for a successive time increment if steady state is not determined in step (iv), (vi) storing the fractional flow rates, pressure, and saturation values calculated in step (iii) if quasi steady state is determined in step (iv), (vii) determining after step (iv) if the final index values of the variables stored for the storage plane in the precursor simulation have been reached, (viii) repeating steps (iii), (iv), (v), and (vi) if determined in step (vii) that the final index values for the variables stored for the storage plane in the precursor simulation have not been reached, comprising using inflow conditions for the calculating in step (iii) which correspond to successively stored index values of the variables at the storage plane from the precursor simulation, and (ix) calculating relative permeability of at least one of the wetting phase and non-wetting phase if the final index values stored for the storage plane in the precursor simulation are determined to have been reached in step (vii).

The present invention also relates to a system for computing or determining or estimating for estimating relative permeability for fractional multi-phase, multi-component fluid flow through a porous medium comprising (a) a scanner capable of producing a three dimensional digital image of a porous medium, (b) a computer comprising at least one processor operable for executing a computer program capable of classifying elements in the three dimensional digital image as solid (grain) and pore (void), (c) a computer comprising at least one processor operable for executing a computer program capable of performing the indicated computations, and (d) at least one device to display, print, or store results of the computations.

The present invention also relates to a computer program product on a computer readable medium that, when performed on a controller in a computerized device provides a method for performing one or more or all of the indicated computations.

The present invention also relates to use of the indicated method and/or system to calculate or estimate relative permeability, and use of the calculated or estimated relative permeability to provide improved evaluations and estimates of the productivity of a subterranean reservoir. The methods and systems of the present invention also can be used to provide numerically modeled evaluations of fractional multi-phase/multi-component fluid flow through other type of porous media.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1:
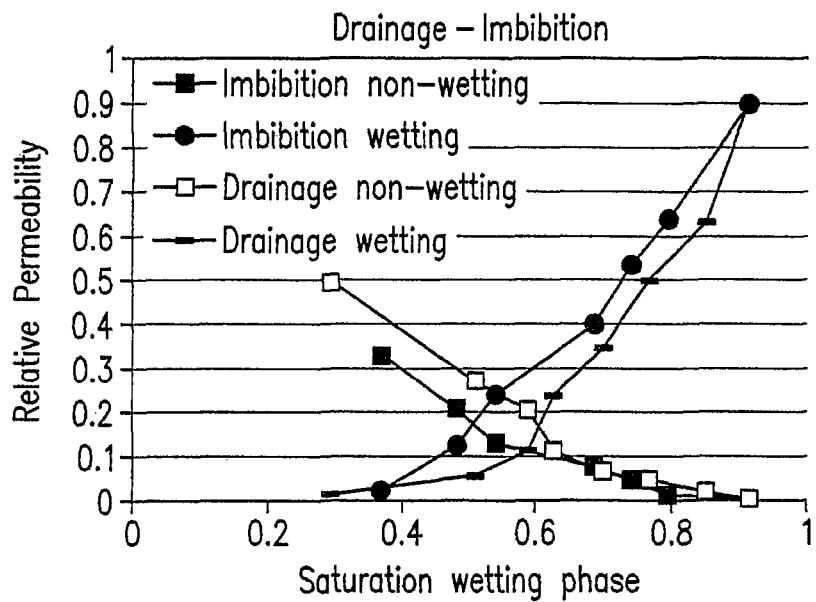
FIG. 1 shows a representative plot of a hysteresis effect in relative permeability under imbibition and drainage.
Figure 2:
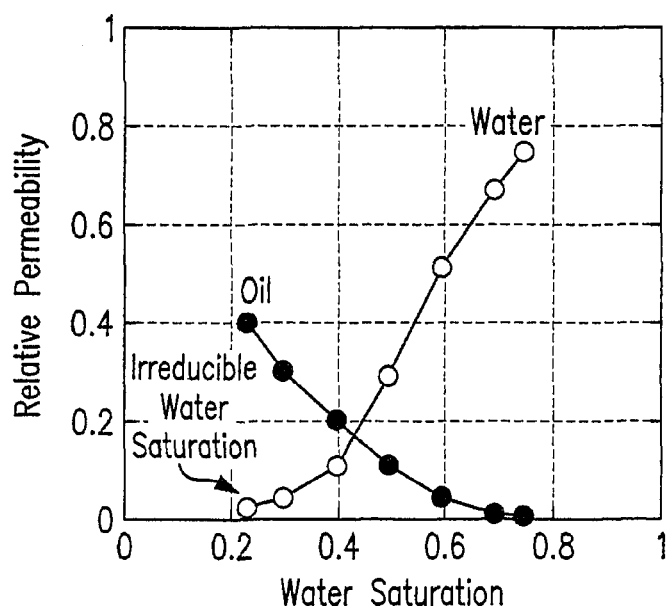
FIG. 2 is a representative plot of relative permeability for wetting and non-wetting fluids at saturation levels ranging from 0 to 1.

The present invention relates in part to a method for computing relative permeability for fractional multi-phase, multi-component fluid flow through a porous medium. The method can employ a three-dimensional (3D) digital representation of a porous medium integrated with a computational fluid dynamics (CFD) method of calculating fractional flow rates, pressures, saturations, internal velocity vectors, and/or other flow parameters, which can provide improved determinations, e.g., more rapid and/or accurate determinations, of fluid transport properties of the porous medium. These determinations of fluid transport properties can include calculating or estimating the relative permeability of wetting and non-wetting phases (fluids) in the porous medium. The present invention further relates in part to a method which integrates a single-phase-inlet precursor simulation used to evaluate distribution of pressure, saturation and velocity map (that are set of variables) at different saturation levels, every level distinguished by an index integer number in a preselected storage plane of a three-dimensional (3D) digital representation of a porous medium. The stored variables are assigned as multiphase inlet in the workflow of a second simulation that can calculate velocity, pressure and saturation distribution of non-wetting fluids and wetting fluids injected at different fractional flow combination as established at the storage plane. The results of the computation in the second simulation can be used to calculate relative permeability or other fluid transport properties for the porous medium. The method of the present invention includes a precursor simulation which can provide distribution of the two phases within the computational domain when only one phase is injected at the inlet, and a second simulation that spatially starts at a specific storage plane of the precursor simulation and uses as multi-phase inlet the flow rate fraction, pressure and saturation of the two phases recorded at the storage plane for different fractional flow combination, each combination been a storage process of variables memorized with an incremental index at the storage plane at different time step. In this way, the multi-phase inlet used to calculate different fractional flow combination inside the volume of the second simulation comes from an exact solution, so it is not an approximation; this means that the distribution of the two phases at the inlet of the second simulation accounts for the porosity distribution of the rock upstream and downstream the plane other than the time history of each flowing phase.

The method of the present invention can be used to calculate the flow distributions and relative permeabilities of multi-phase, immiscible fluids through porous media without need of laboratory analyses. For example, these determinations can be made without the need for expensive or time consuming laboratory experiments on physical samples of the porous medium. The ability to make these determinations on the fluid transports characteristics of the porous media can improve the accuracy of cost and technical decision-making made with respect to production on the porous media. Computerized systems and computer programs for performing the method are also provided.

The invention can employ, for example, a unique method which comprises performing a first simulation, referred to herein as a precursor simulation, and second simulation, which together can be used to generate relative permeability values and other fluid transport property values for a porous medium using a 3D digital representation thereof and CFD calculations. The precursor simulation of the method of the present invention can be performed with single phase injection (flooding) of a first computational domain of a segmented 3D digital representation of a porous medium, wherein the first computational domain extends between an inlet plane and an outlet plane, and includes a selected specific plane, which is referred to herein as "storage plane," which is located between the inlet and outlet planes. The storage plane can be oriented parallel to the inlet and outlet planes. The location of the selected storage plane relative to the inlet and outlet planes is not limited. If 1000 planes, for sake of illustration, extend between the inlet and outlet planes of the first computational domain, with their numbering starting at the inlet plane (i.e., plane 1) and ending at the outlet plane (i.e., plane 1000), the selected storage plane can be, for example, plane 50, 100, 200, 250, 300, 400, 500, 600, 700, 750, 800, 900, 950, or any other plane between planes 1 and 1000. Pores at an inlet face of the 3D digital representation of a porous medium are flooded with a single phase fluid in the precursor simulation. The domain of the precursor simulation can be filled initially either with the opposite phase of the one injected or a combination of the two (wetting and non-wetting). Pressure at the inlet plane can be set constant, and fluid/fluids is/are expelled towards and ultimately crosses the storage plane and outlet plane during the precursor simulation. Flow rate, pressure, saturation, and velocity distributions at points in the first computational domain, such as at all points, are calculated and recalculated over successive time increments during the simulation. Set of variables are generated in the precursor simulation, which are retrievably stored with an index for use in the second simulation. Each time the storage operation is done the index is incremented. The stored variables with different increasing index generated in the precursor simulation can be related to fractional distribution variables calculated with respect to the selected storage plane at occurrences of preselected saturation change during the precursor simulation. The inlet boundary conditions of the second simulation can be based in part on these stored index values for the storage plane that were obtained by the precursor simulation. The stored index values, for example, can be sets of variables. The sets of variables can comprise, for example, saturation distribution, pressure distribution, and velocity distribution of the wetting and non-wetting phases in the computational domain of the porous medium, which are (re)calculated during the precursor simulating at different time increments (e.g., t=0, t=1, t=2, t=3, and so on) and stored as different indexed values when a preselected saturation change occurs. These sets of variables are stored in an indexed manner as the index values (e.g., i=0, i=1, i=2, i=3, . . . i=n=final). The index values that comprise the indicated sets of variables can be stored during the workflow of the precursor simulation when a saturation value generated from a specific calculation cycle in the workflow is determined to meet one of a plurality of preselected saturation target values.

As indicated, "saturation" is the volume fraction of the total pore volume in a porous medium that is occupied by a given fluid material. The saturation level is a value between 0 and 1. A saturation level of 1 indicates that the entire available pore space in a given porous medium is filled by the fluid under consideration. In the workflow of the precursor simulation, "saturation" can refer, for example, to one of water saturation (Sw) or oil saturation (Snw). In the workflow of the precursor simulation where water flooding is used, references to "saturation" can refer to water saturation (Sw).

After the precursor simulation, another simulation, which is referred to herein as the second simulation, is performed on the same segmented 3D digital representation of a porous medium with a different computational domain from the precursor simulation. The computational domain used in the second simulation extends from the same storage plane selected for use in the precursor simulation to the same outlet plane used in the precursor simulation or any other plane upstream the outlet of the precursor simulation. In the second simulation, the index values (and their corresponding sets of variables) stored from the precursor simulation are used in setting the inlet inflow conditions at the storage plane (x) used as the inlet plane in the second simulation. The second simulation can be repeated for each of the sets of variables corresponding to the index values (i) generated from the precursor stimulation until a steady state is reached for each of the sets of variables of the index values, at which points the fractional flow rate, saturation and pressure distribution values of the wetting and non-wetting phases are stored in the entire domain of the second simulation. As indicated, this computational workflow can be repeated for each of the stored index values obtained from the precursor simulation. Then, values of relative permeability versus saturation for the wetting and non-wetting phases of the porous medium can be computed using the fractional flow values and pressure that have been calculated and stored in the indicated workflow of the second simulation. The resulting values of the second simulation may be used to generate plots of relative permeability imbibition and drainage curves, or other plots.

For purposes of this invention, the term "multi-phase" refers to multiple phases of an element of compound such as liquid and vapor and to multiple compounds in a mixture such as oil and water. The fluids are categorized as wetting fluids and non-wetting fluids. Wetting fluids are those fluids that tend to cover or adhere to the interior surface of pores in the porous medium. Wettability is the tendency of one fluid to spread on, or adhere to, a solid surface in the presence of other immiscible fluids. Wettability is defined by the contact angle of the fluid with the solid phase. One example of the present invention describes a system comprising one wetting fluid and one non-wetting fluid. However, the methods described herein can apply to systems comprising multiple wetting and/or non-wetting fluids. The porous medium to which the methods described herein can be applied is not necessarily limited. The porous medium can comprise, for example, rocks; soils; zeolites; biological tissues such as bones, wood, cork and similar materials; cements; ceramics; compacted solid particles such as sand, clay, rock, ceramics, inorganic compounds, organic compounds, metals and similar materials; synthetic materials such as polymers; and other similar materials.

Figure 3:
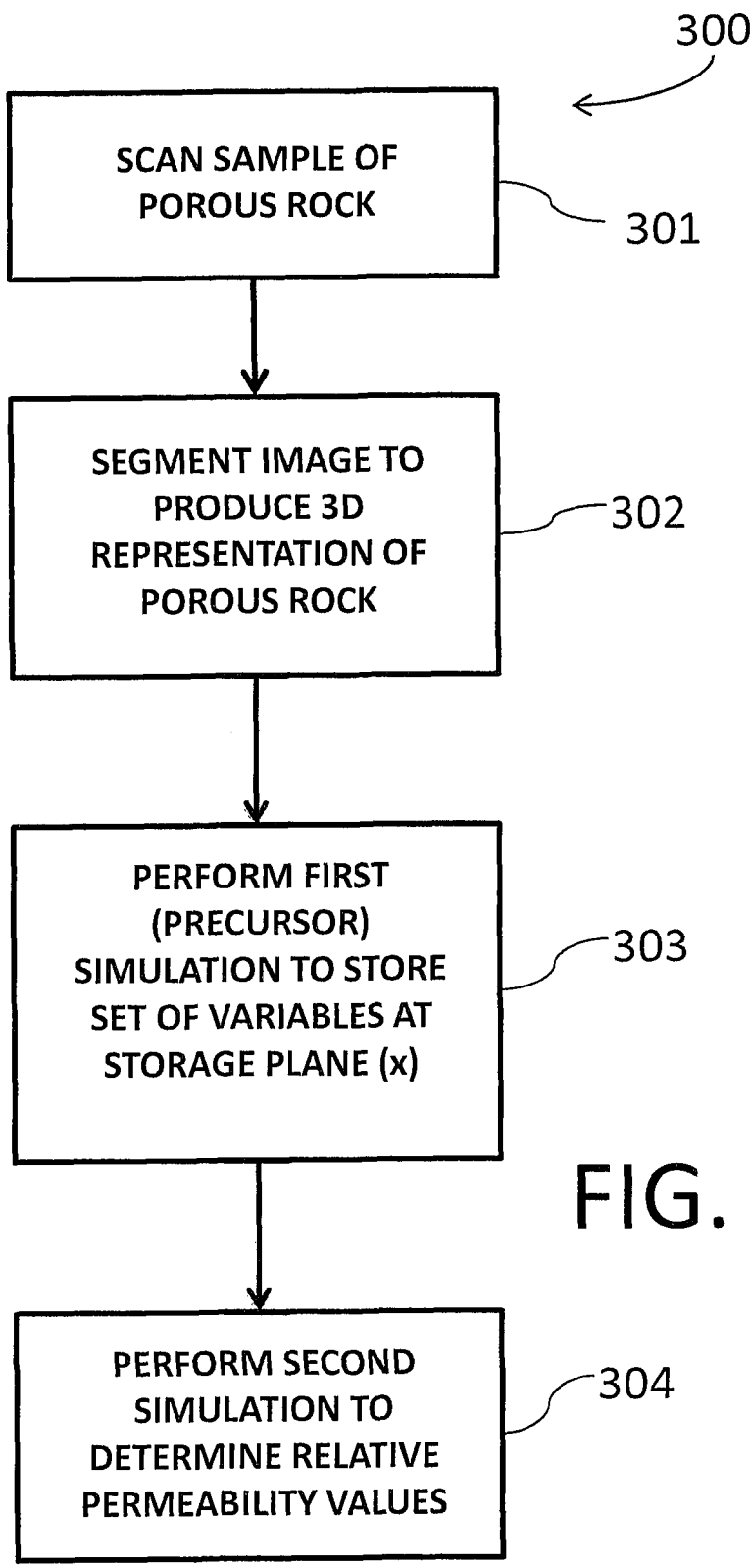
FIG. 3 is a flow chart showing a method according to an example of the present application.

Referring to FIG. 3, a method of an example of the present invention is shown for determining relative permeability for wetting and non-wetting phases in a porous medium, which is generally indicated as process (300). A physical sample from a porous medium, such as a rock, can be scanned (301) with a device capable of producing a three-dimensional (3D) digital representation of the porous structure of the sample. The source of the sample, such as in the instance of a rock formation sample, is not particularly limited. For rock formation samples, for example, the sample can be sidewall cores, whole cores, drill cuttings, outcrop quarrying samples, or other sample sources which can provide suitable samples for analysis using methods according to the present invention. Devices such as a CT scanner can be used for this purpose where the sample is exposed to x-rays of a particular frequency. The frequency determines the resolution of the scan. Examples of suitable CT scanners for making images usable with methods according to the present invention include, for example, 3D tomographic x-ray transmission microscopes, such as MicroXCT-200 and Ultra XRM-L200 CT, which are made by Xradia, Inc. (Concord, Calif. USA). The scans can be done non-destructively or destructively with respect to the sample. For very fine-grained porous media such as shales, the scans may be performed on a scanning electron microscope, SEM, or a focused ion beam scanning electron microscope (FIB-SEM scanning). The software supplied with the scanning machine tomographically reconstructs the 3D volume in an ordered array of voxels.

The segmentation process (302) classifies individual voxels as either solid or pore. A three-dimensional digital representation can be created of the Sample (porous medium), for example, which comprises multiple, ordered planes of voxels wherein each of the voxels can represent a pore (pore voxel) or solid (grain voxel). There may be more than one class of materials in the porous medium. The segmentation process is necessary due to the resolution of the scanner as compared to the size of the grains and pores in the porous medium. A number of methods to segment the 3D gray scale representation can be used for this purpose. One such method, for example, is described by Nur in U.S. Pat. No. 6,516,080, which is incorporated herein by reference in its entirety. Another gray scale and segmentation process which can be adapted for use in the present methods is U.S. Patent Application Publication No. 2010/0128932 A1, which is incorporated herein by reference in its entirety. Any method capable of producing a digital 3D representation of a porous medium can be sufficient for the present invention. After image segmentation (302), a precursor simulation (303) followed by a second simulation (304) are performed, which also are described in further detail in discussions of other related figures provided herein.

The precursor simulation (303) can be performed with single phase injection (flooding) into the pores at an inlet face of the 3D digital representation of a porous medium from an inlet plane, through a selected storage plane, and up to an outlet plane, with storing of a generated set of variables calculated on the storage plane during the precursor simulation. For the precursor simulation, the sample can be flooded with a single phase, such as the wetting fluid or the non-wetting fluid, and effects on the distribution of saturation values at the storage plane are monitored over a time history and a set of variables, such as flow rate, velocity, pressure and/or saturation distribution, are stored with a set of index values at each of multiple preselected saturation value targets, until a quasi steady state is reached at the storage plane. At some point of the flooding procedure that can be performed for example with water wetting-phase, the porous medium is going to have residual irreducible oil or other non-wetting phase entrapped in the pores within the pores volume and at the storage plane location as well. Such non-wetting phase will no longer be dislodged and reduced by any further flooding of water, so a quasi steady state is going to be reached in the precursor simulation and the last set of variable at the storage plane can be stored.

After the precursor simulation (303), a second simulation (304) can be performed on the 3D digital representation of a porous medium with a computational domain that extends from the same storage plane of the precursor simulation to the same outlet plane as used in the precursor simulation. In the second simulation, the sets of variables stored from the precursor simulation for the storage plane (x) are used in setting the inlet inflow conditions for the second simulation. The second simulation is repeated for each stored set of index values from the precursor stimulation. When a steady state is reached in the second simulation for computations based on each set of index values, the distributions of pressure, saturation and flow rates of the wetting and non-wetting phases are stored. This workflow of the second simulation is repeated for each of the stored sets of index values obtained for the storage plane in the precursor simulation. Then, values of relative permeability for the wetting and non-wetting phases of the porous medium can be computed using the indicated fractional distribution values stored in the second simulation.

Figure 4:
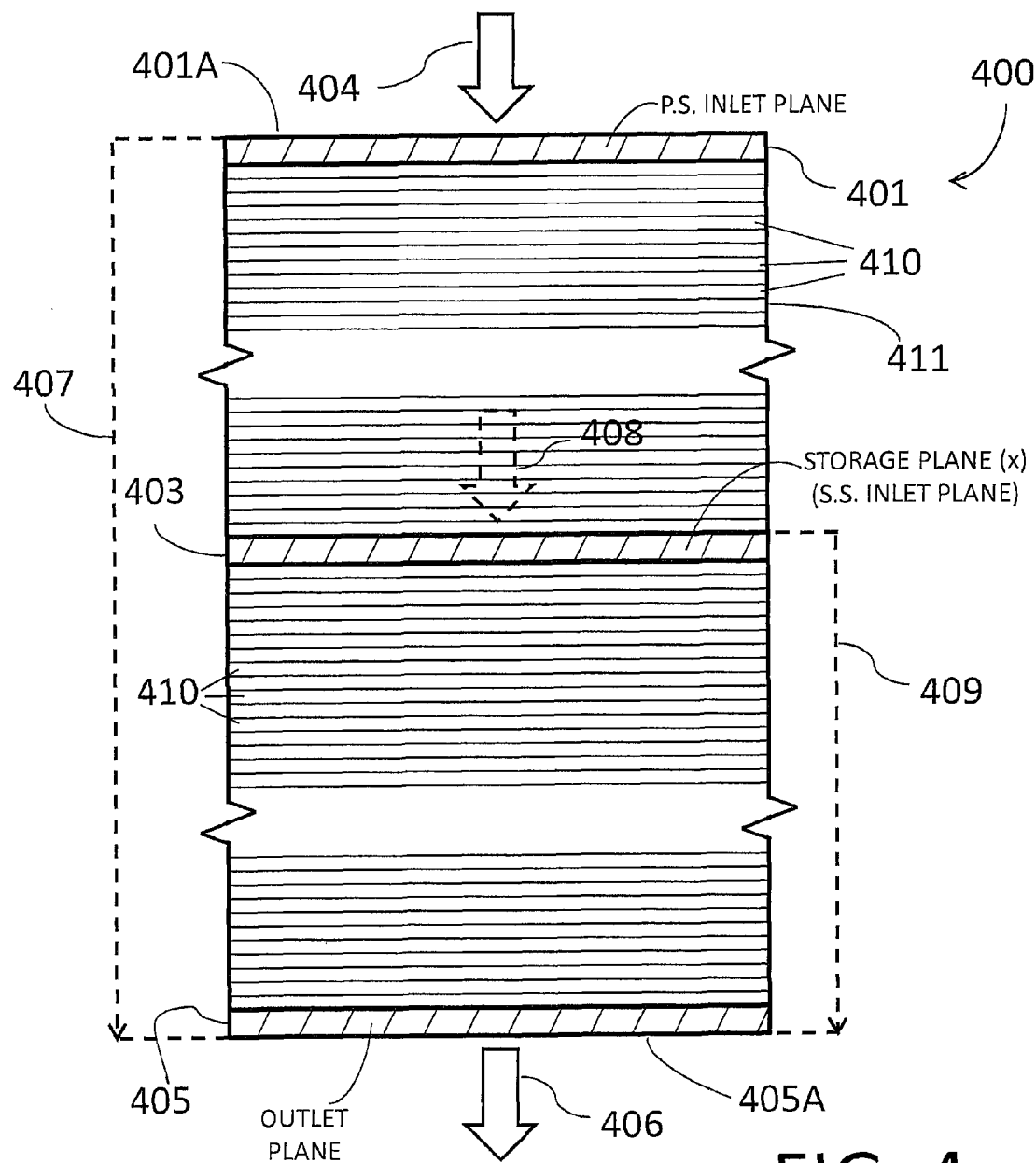
FIG. 4 is a schematic diagram which shows inlet, storage, and outlet planes of computational domains used in first (precursor) and second simulations of a method according to an example of the present application.

FIG. 4 shows computational domains in the 3D digital representation developed from the scanning and segmenting of the porous medium or Sample (400), which can be used in the indicated precursor and second simulations. The Sample (400) can comprise a volume (411) defined by an inlet face 401A and an outlet face 405A, and three or more surfaces orthogonal to the inlet face (401A) and the outlet face (405A). The inlet and outlet faces can be parallel to each other. The computational domains, as shown in FIG. 4, are defined in the 3D digital representation of a porous medium that has been generated by scanning and segmenting, such as described herein. In computational domain (407), which can be used for the indicated precursor simulation, an inlet plane (401), a storage plane (x) also identified as plane (403), and an outlet plane (405) are shown as cross-hatched slices. Other intervening planes (410) are generally shown without the cross-hatching. The total number of intervening planes in sample (400) is not necessarily limited. The total number of planes used in the volume (411) is not necessarily limited. For the precursor simulation, for example, a plane location (403) within the 3D digital representation of the sample (400) can be selected and fixed to be the storage plane. As indicated, this selected storage plane is used as the inlet plane for fractional flow simulation of the second simulation of a method of the present invention. The inlet plane (401) located upstream of the location of the selected storage plane (403) also is selected, and serves as the flooding inlet for the precursor simulation. The outlet plane (405) from which fluids (406) are discharged from the volume (411) is located downstream of the storage plane (403) as shown in the 3D digital representation of the porous medium. The same outlet plane can be used for both the precursor and second simulations. For the precursor simulation, a single phase injection (404) is initiated at the inlet plane (401). If the porous medium contains two phases, for example, wetting and non-wetting phases, the flooding fluid can be either wetting only or non-wetting only. In an example, the flooding fluid can be a wetting fluid. If the porous medium contains only a single type of fluid, e.g., wetting or non-wetting fluid only, then the flooding fluid can be selected to be the other type of fluid that is not present in the porous medium. In computational domain (409), which can be used for the indicated second simulation, storage plane (403) is used as the inlet plane for dual phase injection (408) which can be used for this second simulation, and the same outlet plane (405) as used for the precursor simulation is also used as the outlet plane for the second simulation. The dual phase injection can refer to injection of both wetting and non-wetting fluids. As indicated, in FIG. 4, intervening planes 410 also are shown which are located between these indicated inlet, storage and outlet planes or slices. These intervening planes 410 are merely illustrative and not limiting such as with respect to their number. The indicated precursor simulation and the second simulation are further described herein with reference made to FIGS. 5, 6, 7A, and 7B.

Figure 5:
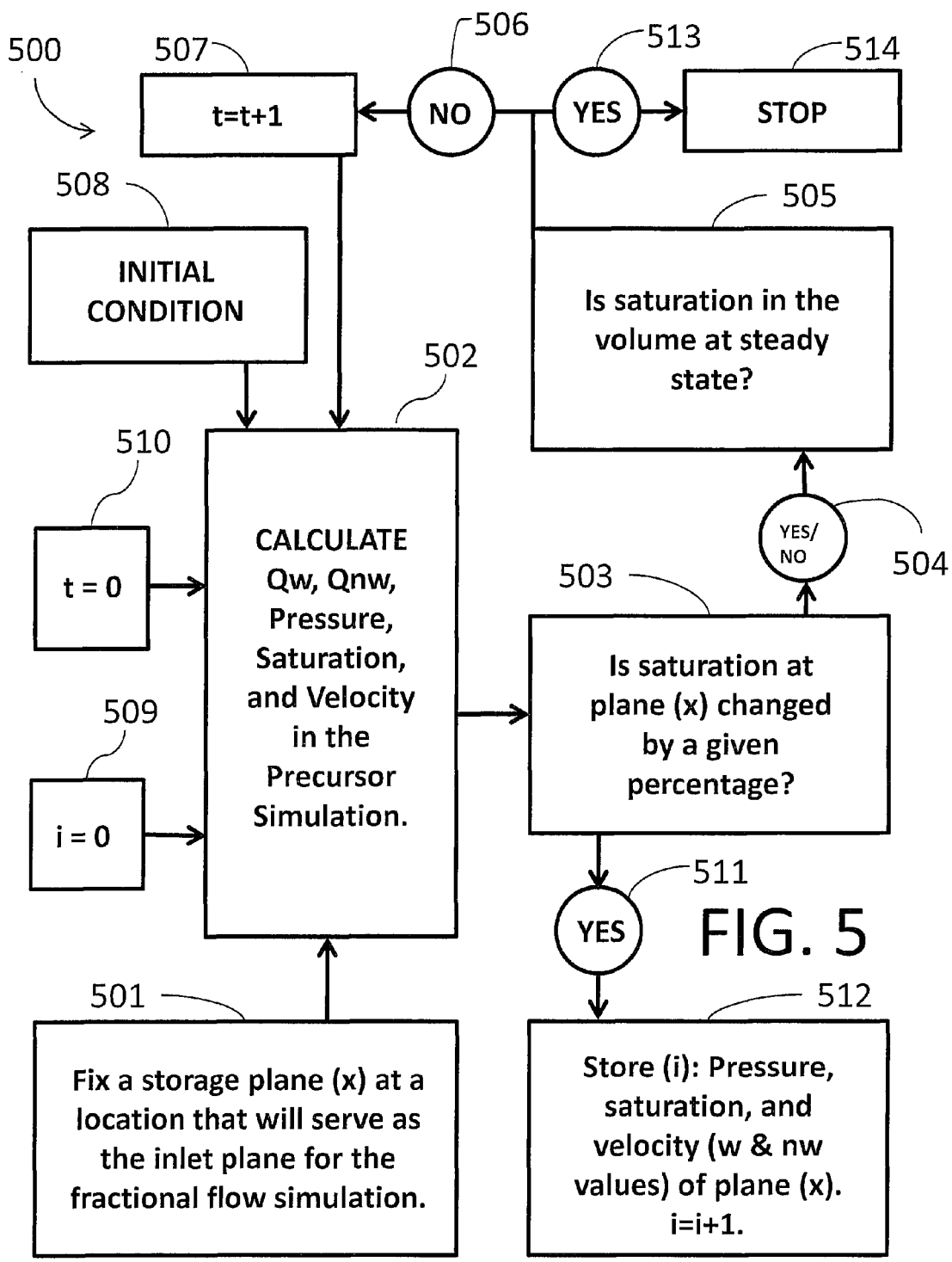
FIG. 5 is a block diagram which shows a precursor simulation of a method according to an example of the present application.
Figure 7A:
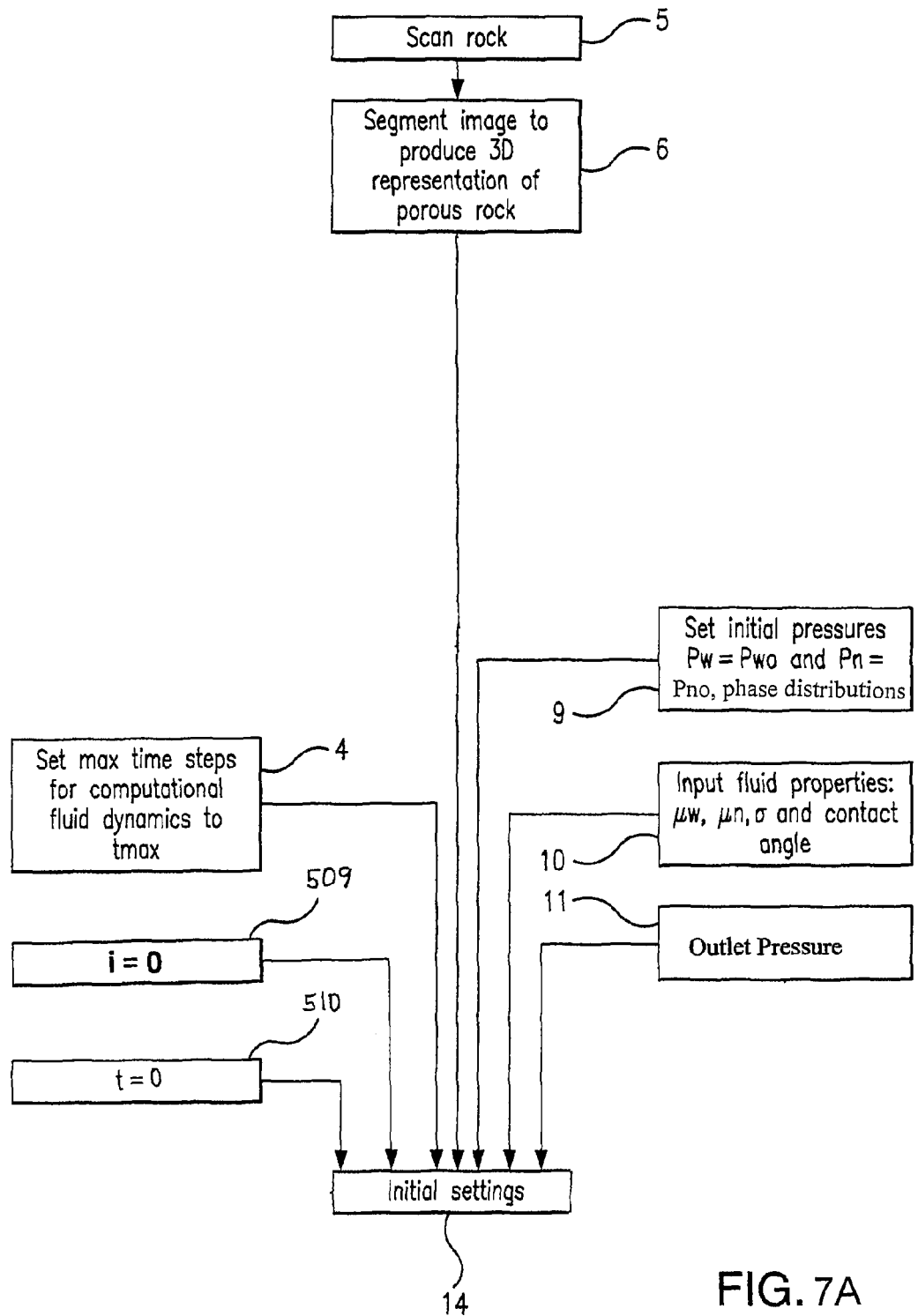
FIG. 7A is a block diagram which shows a method for establishing initial settings for the precursor simulation, according to an example of the present application.

FIG. 5 shows a precursor simulation of a method of the present invention, which comprises process (500). In step (501), a plane location within the 3D digital representation is selected and fixed to be the storage plane (x). The storage plane (x) becomes the inlet plane for the fractional flow simulation of the second simulation that follows the precursor simulation. Steps (508), (509), and (510) show initial settings used for the precursor simulation. The initial settings of steps (508), (509) and (510) are shown as initial settings (14) in FIG. 7A. As shown in FIG. 7A, for example, the parameter t is an index for the number of time steps in the precursor simulation. t is initially set to 0 in step (510). The variable "i" is the increment of the index values stored for storage plane (x) during the precursor simulation. i is initially set to 0 in step (509). As indicated in FIG. 7A, the initial condition supplied in step (508) can include, for example, the maximum time steps which is referred to herein as tmax (4), the segmented image data obtained from scanning the rock (5, 6), outlet pressure (11), initial pressures and phase distribution of the wetting fluids (Pw) and non-wetting fluids (Pn) (9), and fluid properties (10), such as viscosity ($\mu_w$, $\mu_n$), contact angle, interfacial tension ($\sigma$), and/or other physical or chemical properties. The parameter tmax (4) is a value for the maximum number of time steps to be completed in the workflow of the simulation. Fluid properties are inputted, which are used for the calculation of fluid flows and for calculation of relative permeability (10). Outlet pressure (11) also is selected for the simulation. As used herein, an "outlet pressure" can be the outlet pressure of the computational domain. Once initial settings (14) have been established, they are available for use in the precursor simulation such as shown in FIG. 5.

The initial settings (508), (509) and (510) can be used in calculation step (502) shown FIG. 5 in the calculation of flow rates, pressures, saturations, and velocity vectors of wetting and non-wetting phases, and/or other properties for all points located in the indicated computational domain within the porous medium (Sample). These calculations can be done using computational fluid dynamics (CFD) calculations. At t=0, for example, the inlet plane can be 100% assigned to the wetting phase, so that a primary flooding is performed (100% injection). In calculation step (502), a first set of variables can be calculated beginning at zero time (t=0) for all points in the indicated computational domain of the porous medium used for the precursor simulation. As indicated, it may be possible to use a lesser number of representative points within the computational domain for these calculations. The calculated first set of variables can comprise fractional flow rates of the wetting fluids and non-wetting fluids (Qw, Qnw), pressure distributions of the wetting fluids and non-wetting fluids (Pw, Pnw), saturation distributions of the wetting fluids and non-wetting fluids (Sw, Snw), and velocity vectors of the wetting fluids and non-wetting fluids (Vw, Vnw), internal to the porous medium (Sample). In step (503), the saturation at plane (x), such as the saturation of wetting fluids (Sw) or non-wetting fluid (Snw) at storage plane (x), can be checked to determine if the saturation has changed one of a plurality of preselected percentage (%) change thresholds. These preselected change thresholds for saturation can be, for example, 1%, or 2%, or 3%, or 4%, or 5%, or 10%, or 15%, or 20%, or 25%, or other preselected percentage change thresholds and any combinations thereof. For example, the threshold of "1%" can mean, for example, the first instance (or every instance, or other criterion) in the simulation when the percentage change in saturation is determined to be ≥1% and <2% or other higher value than 1%, or the threshold of "5%" can mean the first instance (or every instance, or other criterion) in the simulation when the percentage change in saturation is determined to be ≥5% and <10% or other higher value than 5%, and so on. The percentage amount of change in saturation can be determined, for example, as based on an original saturation value. The percentage amount change in saturation also may be determined based on a saturation value calculated in a previous iteration of the simulation, or some other previously set or calculated saturation value in the simulation.

If a saturation value of the set of variables calculated in step (502) in FIG. 5 is determined in step (503) to have changed at least one of the plurality of preselected percentage amounts, such as indicated by step (511), then the set of variables calculated on the storage plane (x) in step (502) for the same time interval are stored as index values (i, i+1, i+2, i+3, . . . i=n), and so on, in step (512). Each set of variables that are stored in this manner for the storage plane (x) during the precursor simulation can have a unique successively assigned index value identifier (i value) assigned to them, and the index values can be retrievably stored in the succession as stored in the precursor simulation. These sets of variables stored in step (512) for each (i) value become the corresponding index values (i) used in the second simulation, such as described further herein with reference made to FIG. 6. In FIG. 5, the set of variables stored in step (512) for storage plane (x) are shown as pressure distribution, saturation distribution, and velocity distribution of the wetting and non-wetting phases.

As indicated by step (504) in FIG. 5, if the saturation determined in step (503) has not changed at least one of a plurality of preselected percentage amounts or alternatively after step (512) if it was so determined, then saturation in the volume of the computational domain of the porous medium is checked to determine if quasi steady state has been reached, such as indicated by step (505). Quasi steady state can be defined by a preselected criterion or criteria. For example, a check can be made to see if the precursor simulation has reached a quasi-steady state. With respect to step (505), quasi-steady state can mean that calculated values of saturation do not vary by more than a pre-determined value within a fixed number of time steps. For example, at quasi-steady state, the variation in parameter values between consecutive time increments t or another selected number of increments t, such as for saturation at the storage plane, or other parameters, does not vary by more than a pre-specified value or threshold value. Quasi-steady state condition also can be determined in step (505) by checking to see if a pre-defined maximum number of time increments, tmax, has been reached, or by other methods indicated herein.

If saturation is determined to have reached quasi steady state in step (505) in FIG. 5, such as indicated in step (513), then the simulation can be ended, such as indicated by step (514), and the process can proceed to the workflow of the indicated second simulation. If saturation in the volume is not determined to be at steady state, such as indicated by step (506), the time interval can be incremented, such as indicated by step (507)(e.g., t=t+1)), and step (502) is repeated wherein a new set of variables is calculated for all points in the porous sample in the same computational domain for the next time iteration. Then, saturation at plane (x) is again checked in step (503) to determine if it has changed a predetermined percentage amount, such as since the zero time value or other reference time value. If saturation has changed a preselected percentage amount, then steps (511) and (512) are repeated to store a set of variables calculated on the storage plane in step (502) for the same time interval, which are assigned the next available index value (e.g., i=i+1) if the previously stored index values were assigned index value (i)). If saturation has not changed a given percentage amount as determined in step (503), then saturation in the volume is again checked for steady state in step (505), and if so, the simulation is ended in step (514), and, if not, the simulation is repeated for the next time interval (step 507), and another set of variables is calculated on the storage plane in step (502) for another successive new time interval. This process can be repeated until saturation in the volume is determined to be at quasi steady state in step (505) of the simulation. In this manner, the precursor simulation can generate multiple sets of variables or index values (e.g., i, i+1, i+2, i+3, . . . i+n) up to the final index values (i=final) that are stored for the precursor simulation, which are used in the workflow of the second simulation. Specifically, the index values generated from the precursor simulation, such as in step (512) thereof, can be used in the workflow of the second simulation such as shown in FIG. 6.

Figure 6:
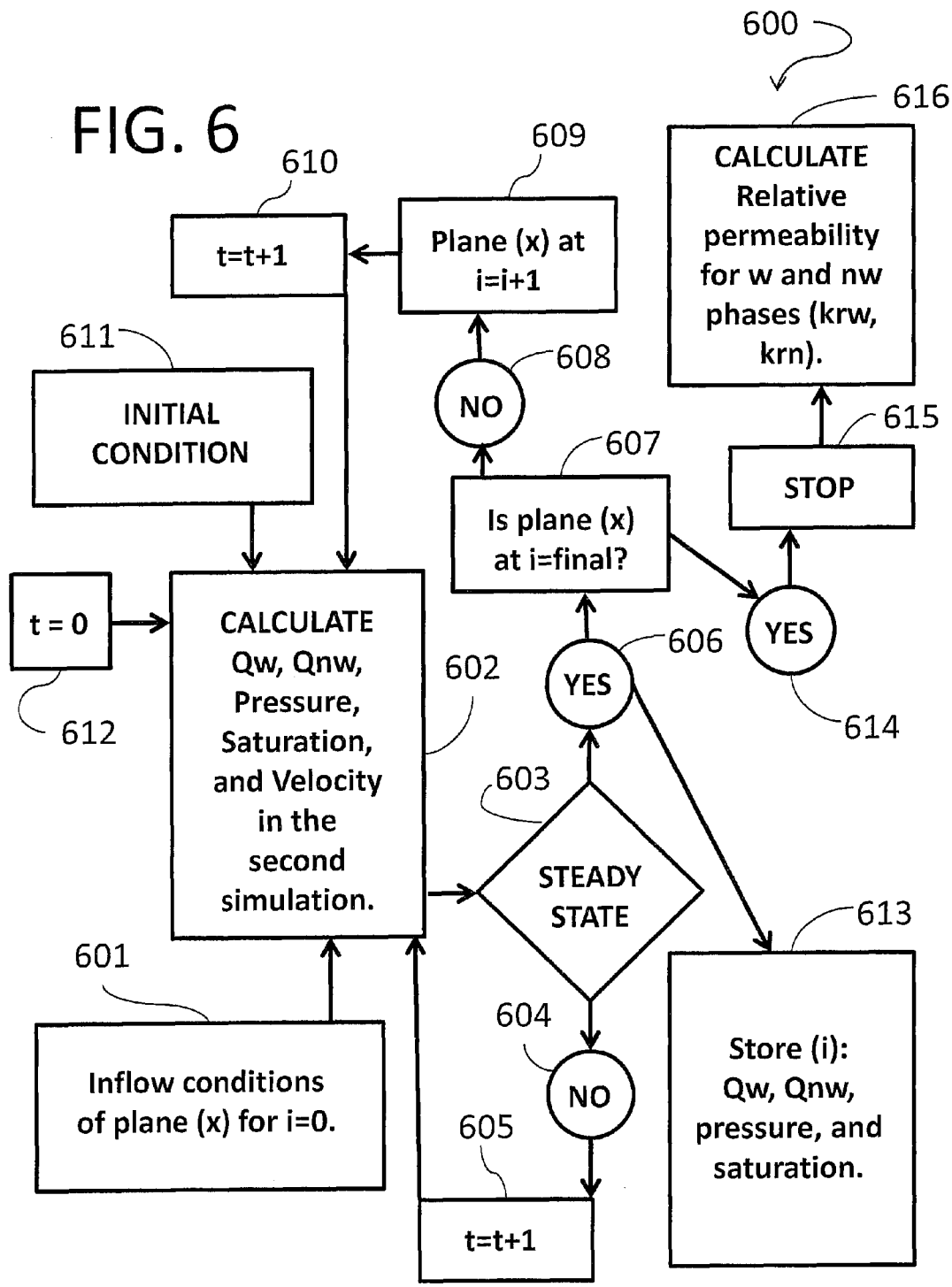
FIG. 6 is block diagram which shows a second simulation of a method according to an example of the present application.
Figure 7B:
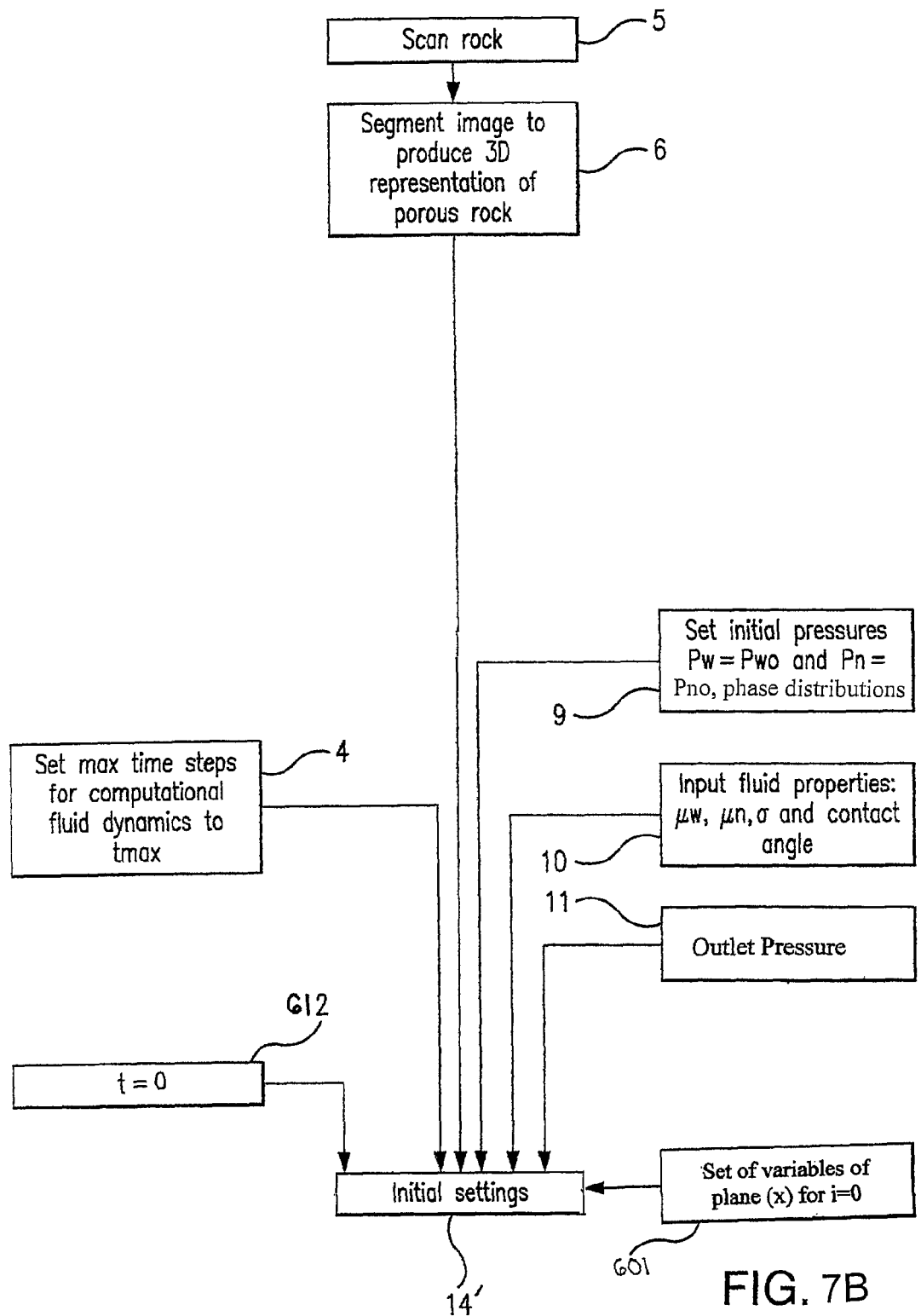
FIG. 7B is a block diagram which shows a method for establishing initial settings for the second simulation, according to an example of the present application.

Referring to FIG. 6, a second simulation comprises a process 600 for generating fractional flow rate and saturation values for the sample, which can be used to calculate relative permeability values for the porous medium. The second simulation can be performed with a dual phase injection using the information recorded from the storage plane (x) of the precursor simulation as the inlet plane for this second simulation with a computational domain that extends from the storage plane (x) up the outlet plane of the previous simulation, i.e., the precursor simulation. The initial inlet settings used for calculation step (602) of the second simulation can include the set of variables for the storage plane (x) for i=0 from the precursor simulation, such as shown step (601). As other initial settings for the second simulation, t can be initially set to 0 as shown in step (612), and the initial condition shown in step (611) can be used. These initial settings (601), (611), and (612) used in the second simulation are shown as initial settings (14') in FIG. 7B. As indicated in FIG. 7B, the initial condition supplied in step (611) can include, for example, the maximum time steps, tmax (4), the segmented image data obtained from scanning the rock (5, 6), outlet pressure (11), initial pressures and phase distributions of the wetting fluids (Pw) and non-wetting fluids (Pn) (9), and fluid properties (typically properties like viscosities and surface tension as the same as the one fixed in the precursor simulation) (10), such as viscosity ($\mu_w$, $\mu_n$), contact angle, interfacial tension ($\sigma$), and/or other physical or chemical properties.

Referring to FIG. 6, and as indicated, in step (601) inflow conditions at the inlet plane of the second simulation, which is storage plane (x), are set according the stored distributions generated in the precursor simulation. For the first saturation distribution at zero time (t=0) of the second simulation, the pressure can be set as it was stored and fraction of two phases can be injected according to the stored fraction in the index values stored for the corresponding interval retrieved from the precursor simulation. In step (602), for example, a first set of variables are calculated beginning at zero time (t=0) for all points in the porous sample in the indicated computational domain used for the second simulation. As indicated, it may be possible to use a lesser number of representative points within the computational domain for these calculations. The calculated first set of variables can comprise fractional flow rates of the wetting fluids and non-wetting fluids (Qw, Qnw), pressure distributions of the wetting fluids and non-wetting fluids (Pw, Pnw), saturation distributions of the wetting fluids and non-wetting fluids (Sw, Snw), and velocity vectors of the wetting fluids and non-wetting fluids (Vw, Vnw), internal to the porous medium (Sample).

In step (603) of FIG. 6, a determination is made as to whether quasi steady state has been reached in the second simulation. For example, a determination can be made to see if the second simulation has reached a quasi-steady state. With respect to step (603), quasi-steady state means that calculated values of Qn, Qw, Pn, Pw and/or saturation do not vary by more than a pre-determined value within a fixed number of time steps. For example, at quasi-steady state, the variation in parameter values between consecutive time increments t or another selected number of increments t, such as for Qn, Qw, Pn, Pw, saturation, or other parameters, does not vary by more than a pre-specified value or threshold value. As an option, quasi-steady state condition can be determined by checking to see if a pre-defined maximum number of time increments, tmax, has been reached at step (603), or by other methods indicated herein. If steady state is not reached yet, such as indicated in step (604), the process can be incremented to the next time interval, such as shown as "t=t+1" in step (605), and a next set of variables are again calculated in step (602) for the successive time iteration for all points in the porous medium in the indicated computational domain used for the second simulation. These steps (602)-(605) are repeated until a quasi steady state condition is reached as determined in step (603). If steady state is reached, as shown in step (606) of FIG. 6, then fractional flow rates (Qw, Qnw) and saturation (Sw, Snw) values and pressures (Pw, Pnw) can be stored for the current i iteration, such as indicated in step (613) within the whole volume.

Then, in step (607) of FIG. 6, after steps (606) and (613), a determination can be made as to whether the stored index values from plane (x) in the computations are at the final index values (e.g., i=final) that were stored in the precursor simulation. If not, as indicated in step (608), the next set of variables with stored index values (i+1) from storage plane (x) of the precursor simulation for the inlet of the fractional flow simulation is retrieved from the memory (e.g., i=i+1), as indicated in step (609), and the process is incremented to the next time interval (e.g., t=t+1) with the new fractional flow applied to the inlet of the fractional flow simulation (second simulation), such as indicated in step (610), and the indicated calculation and steady state checking steps (602) and (603) are repeated. For example, after step (609), in step (602) a new set of variables are calculated for all points in the porous sample in the indicated computational domain used for the second simulation beginning at the next time interval (t=t+1) using inflow conditions of plane (x) based on the next stored time interval (i=i+1) from the precursor simulation. For example, for the second saturation distribution stored and used for setting inlet conditions where the calculations are being based on the inflow conditions of storage plane (x) for successive interval i=i+1, the pressure can be set as stored and the fraction of the two phases can be injected according to the stored fractions that correspond to the same interval value used for storage of this indexed data in the precursor simulation. Then, once steady state is reached in step (603) using the next set of index values obtained from the precursor simulation, in step (607), it again is determined in step (607) if the final stored index values (i=final or n) from the precursor simulation has been reached. If so, such as indicated by step (614), then the simulation is ended, as indicated by step (615). Then, the relative permeability to the wetting phase and non-wetting phase ($K_{rw}$, $K_{rn}$), respectively can be calculated, as indicated by step (616). For the indicated $K_{rw}$ and $K_{rn}$ abbreviations for relative permeability, the subscripts "w" and "n" refer to wetting fluid and non-wetting fluid, respectively. Alternatively, if the final stored index values (i=final) from the precursor simulation has not been reached in step (607) in step (608), the next set of stored variables with index values (e.g., i=i+2) from storage plane (x) for the inlet plane of the fractional flow simulation is retrieved from the memory in step (609), and the process is incremented to the next time interval (e.g., t=t+2) in step (610), and the indicated calculation and steady state checking steps (602) and (603) again are repeated, and so on.

As indicated, for purposes herein, steady state, such as for step (505) in FIG. 5, or step (603) in FIG. 6, can mean quasi-steady state. As indicated, quasi-steady state can mean that calculated values of saturation in step (505) or Qn, Qw, Pn, Pw and/or saturation in step (603) do not vary by more than a pre-determined value within a fixed number of time steps. For example, at quasi-steady state, the variation in parameter values between consecutive time increments t or another selected number of increments t, such as for Qn, Qw, Pw, Pn, saturation, or other parameters, does not vary by more than a pre-specified value or threshold value. As also indicated, tmax (24) in FIGS. 7A and 7B can be a predefined number. As an option, the predefined number of time increments, t, can be set sufficiently large to achieve quasi-steady state. The present invention has found, for example, that setting tmax to a sufficiently large number can achieve quasi-steady state. The magnitude of tmax used in this respect can depend upon the characteristics of the porous medium and the properties of the fluids flowing through the porous medium. The number of time increments can be, for example, set to a value of 10,000 or a lower value, or 100,000 or a lower value, or 1,000,000 or a lower value, or other larger or lower values. In general, tmax may be set to larger values for smaller pore structures and higher viscosity ratios between fluids. As another option, the number of time increments for tmax can be a value that is contingent on certain calculated results meeting some numerical variance threshold (Vt). The pre-specified amount or variance threshold value (Vt) can be set at any desired value. For example, the variance threshold value (Vt) can be a percentage difference with respect to two or more consecutive calculated values for selected parameters. When the variance threshold (Vt) is calculated to be met, t becomes tmax in that iteration. As an option, a threshold value (Vt), which can used to determine if quasi-steady state conditions have been reached in an iteration according to the present method, can be a value of about ±10%, or about ±7%, or about ±5%, or about ±3%, or about ±1%, or about ±0.5%, or other values. For example, if a variance threshold of ±5% is selected and applied to all parameters of interest, e.g., Qn, Qw, Pw, Pn, Sw, Sn and so forth, in the simulation method, and each parameter had a first normalized value of 100 at $t_1$ and a second normalized value in the range of 95-105 at $t_2$, then the ±5% threshold for finding quasi-steady state conditions would be met. In another option, the simulator can be designed to check to see if the selected threshold is met in more than one consecutive iteration. Fractional multi-phase, multi-component fluid through porous media tends by nature to vary over time and typically does not reach a true or absolute steady state. Nevertheless, determinations of properties at quasi-steady state in the present methods have been found to be useful and advantageous for efficiently and accurately estimating fluid transport properties useful for evaluating porous media. The achievement of quasi-steady state can be determined in the present methods, for example, by observation, experience of the person running the simulation, or quantitative methods that examine variance, rolling averages, or other assessments of Qn, Qw, Pw, Pn, saturation, or other parameters.

For the precursor simulation, such as shown in FIG. 5, the porous medium can be initially flooded with either the wetting or non-wetting fluid to totally saturate the sample. As one option, the porous medium can be initially flooded with the wetting fluid. Darcy's law can be used, for example, to make an initial estimate of pressure with the following equation:

$$P_i = \frac{\mu \cdot L \cdot Q}{k_{abs} C \cdot A}$$

where
$P_i$=initial value for pressure of the desired phase, wetting or non-wetting
$\mu$=viscosity of the desired phase
L=length of the Sample in the flow direction
Q=desired flux of the desired phase
$k_{abs}$=absolute permeability of the Sample A=area of the Sample inlet face C=constant, wherein values of the constant, C, may be about 20, or about 30, or about 40, or about 50, or higher values.

The CFD calculations of the precursor and second simulations can be executed in discrete increments. Each increment can be mapped to time increment t, wherein t can be, for example, seconds, milliseconds or other time units. For each time increment, key parameters of the flow through the Sample are calculated. The key parameters can include, for example, the integrated flow rate of the wetting fluid over the Sample volume, V, or a fraction of this volume, at a given time t, $$Qwt = \frac{1}{V}\int_V Qw,$$

the integrated flow rate of the non-wetting fluid over the Sample volume, V, or a fraction of this volume at a given time t, $$Qnt = \frac{1}{V}\int_V Qn,$$

and the internal pressures, velocity vectors for each phase and the saturations for each voxel in the Sample at a given time t. The time step indicator, t, can be incremented by 1 each time the key parameters are calculated, such as shown in FIGS. 5 and 6. Fractional flow rates can be determined based on calculations which comprise use of the above equations as used for determining Qwt and Qnt, wherein the sample volume (V) can be for the whole volume of the computational domain. Qwt and Qnt are the calculated flow rates of wetting and non-wetting fluids, respectively, for time interval t.

Figure 8:
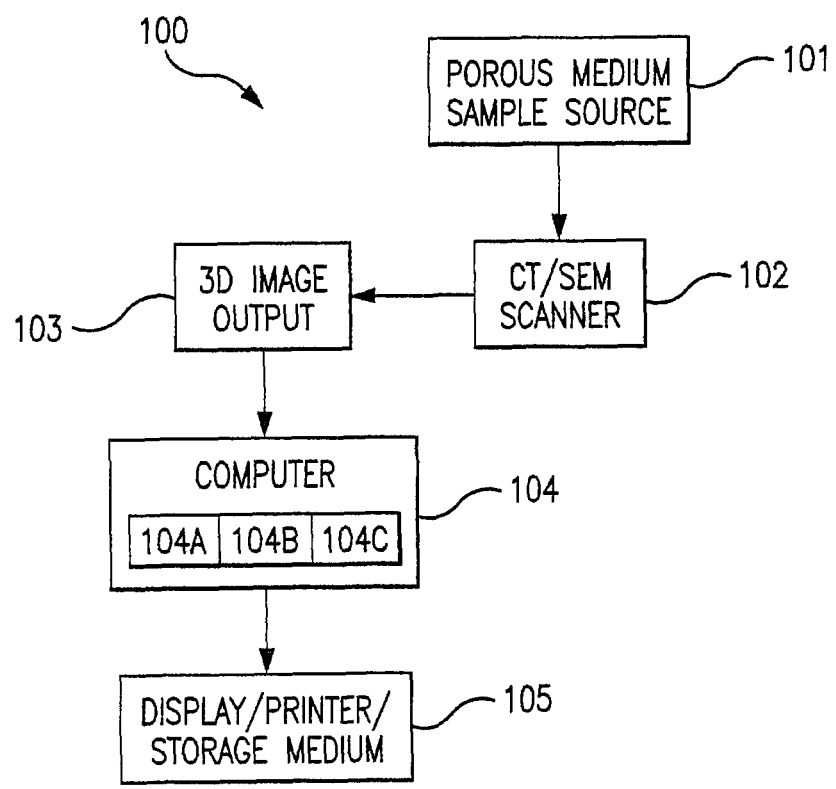
FIG. 8 shows a system which integrates three-dimensional (3D) scan imaging analysis of a porous medium with a computational fluid dynamics (CFD) method applied to a 3D digital representation of the porous medium, according to an example of the present invention.

Referring to FIG. 8, a system (100) is shown which can be adapted for performing the present methods. As shown in this example, three dimensional (3D) images of the porous medium samples obtained from source (101) are generated by the scanner (102). The scanner can comprise, for example, a computer tomographic (CT) scanner, a scanning electron microscope (SEM), a focused ion beam scanning electron microscope (FIB-SEM), or similar device capable of producing a three dimensional digital image of a porous medium. The 3D image output (103) of the scanner can be transferred to a computer (104) having program instructions for carrying out the 3D image analysis, and the indicated CFD data and simulation analysis, to generate sample modeling output/results which can transmitted to one or more devices (105), such as a display, a printer, data storage medium, or combinations of these. The computer programs used for 3D image analysis and the CFD computations and simulation modeling can be stored, as a program product, on at least one computer usable storage medium (104B) (e.g. a hard disk, a flash memory device, a compact disc, a magnetic tape/disk, or other media) associated with at least one processor (104A) (e.g., a CPU or GPU) which is adapted to run the programs, or may be stored on an external computer usable storage medium (not shown) which is accessible to the computer processor. Computer (104) can include at least one memory unit (104C) for storage of the programs, input data and output data, and other program results, or combinations of these. For output display, device (105) can be, for example, a display monitor, CRT, or other visual means of display (not shown). The computer (104) may include one or more system computers, which may be implemented as a single personal computer or as a network of computers. However, those skilled in the art will appreciate that implementations of various techniques described herein may be practiced in a variety of computer system configurations, including hypertext transfer protocol (HTTP) servers, hand-held devices, multiprocessor systems, microprocessor-based or programmable consumer electronics, network PCs, minicomputers, mainframe computers, and the like. The units of system (100) including scanner (102), computer (104), and output display and/or external data storage (105), can be connected to each other for communications (e.g., data transfer, etc.), via any of hardwire, radio frequency communications, telecommunications, internet connection, or other communication means.

The present invention includes the following aspects/embodiments/features in any order and/or in any combination:

1. A method for estimating relative permeability for fractional multi-phase, multi-component fluid flow through a porous medium comprising steps of:

(a) creating a three dimensional digital representation of a porous medium;

(b) performing a first or precursor simulation over a first computational domain of the three-dimensional (3D) digital representation of the porous medium, wherein the first computational domain extends from an inlet plane to an outlet plane and a selected storage plane is located between the inlet and outlet planes, which comprises:

(1) setting the initial condition for the precursor simulation where the initial distribution of the fluid is single or multi-phase flow within the volume, (2) defining a nominal pressure at the outlet of the volume, (3) assessing properties of the wetting fluids and non-wetting fluids, (4) defining an inlet pressure in order to have a selected flow rate, (5) simulating injecting of single phase fluid into the inlet plane of the sample towards the storage plane and the outlet plane, (6) calculating sets of variables comprising fractional flow rates, pressures, saturations, and velocities of wetting and non-wetting phases for all points in the porous medium within the first computational domain for successive time increments;

(7) determining if saturation at the storage plane has changed one of a preselected percentage amounts after the calculating done at each of the time increments of step (6), and if so, storing index values for the storage plane wherein the stored index values comprise sets of variables which comprise the saturations, and/or pressures, and/or velocities of the wetting and/or non-wetting phases of the storage plane measured for the time increment for which the determining is done, (8) determining after step (7) if saturation in a volume of the porous medium defined by the first computational domain is at quasi steady state, (9) repeating steps (5), (6), and (7) for a successive time increment if saturation in the volume is not determined to be at quasi steady state in step (8) or ending the simulating of step (5) if quasi steady state is determined in step (8), wherein a last set of stored index values in step (7) are designated final index values, (c) performing a second simulation over a second computational domain of the three-dimensional (3D) digital representation of the porous medium sample, wherein the second computational domain is defined by said storage plane which represents an inlet plane for the second computational domain and said outlet plane used in the precursor simulation, which comprises
    (i) setting the initial condition for the precursor simulation where the initial distribution of the fluid is single or multi-phase flow within the volume,
    (ii) defining a nominal pressure at the outlet of the volume,
    (iii) setting inlet flow conditions of the second simulation from the storage plane of the precursor simulation, wherein a first plane determines a first fractional flow injection of wetting and non-wetting fluid,
    (iv) simulating injecting of dual phase fluids into the inlet plane of the sample of the second simulation towards the outlet plane, wherein fractions of wetting and non-wetting phases are injected according to the saturation and pressure distribution values stored from the precursor simulation at the storage plane, beginning with initial index values of zero for the first couple of fractional flows stored in the precursor simulation,
    (v) calculating fractional flow rates, pressures, saturations, and velocities of the wetting and non-wetting phases for all points in the porous medium within the second computational domain for a time increment during the simulating of step (iv),
    (vi) determining after step (v) if quasi steady state is reached,
    (vii) repeating steps (v) and (vi) for a successive time increment if quasi steady state is not determined in step (vi);
    (viii) storing the fractional flow rates, pressures and saturations distribution calculated in step (v) if quasi steady state is determined in step (vi),
    (ix) determining if the final index values stored for the variables at the storage plane in the precursor simulation have been reached if quasi steady state is determined in step (vi),
    (x) repeating steps (v), (vi), (vii), and viii) if determined in step (ix) that the final index values stored for the storage plane in the precursor simulation have not been reached, comprising using inflow conditions for the calculating in step (v) which correspond to successively stored index values for the variables at the storage plane from the precursor simulation, and
    (xi) calculating relative permeability of at least one of the wetting phase and non-wetting phase if the final index values stored for the variables at the storage plane in the precursor simulation are determined to have been reached in step (ix).

2. The method of any preceding or following embodiment/feature/aspect, wherein the inlet plane, storage plane, and an outlet plane are parallel to each other.

3. The method of any preceding or following embodiment/feature/aspect, wherein the porous medium is rock, soil, zeolite, biological tissue, wood, cork, cement, ceramic, sand, clay, inorganic compound, organic compound, or metal.

4. The method of any preceding or following embodiment/feature/aspect, wherein the segmented 3D digital representation of the porous medium comprises multiple, ordered planes of voxels, wherein each of the voxels represents a pore (pore voxel) or solid (grain voxel).

5. The method of any preceding or following embodiment/feature/aspect, wherein the injecting of a single phase of fluid into the porous medium in the precursor simulation comprises injecting a wetting fluid into a porous medium containing at least non-wetting fluid.

6. The method of any preceding or following embodiment/feature/aspect, wherein the injecting of a single phase of fluid into the porous medium in the precursor simulation comprises injecting water or brine into the porous medium.

7. The method of any preceding or following embodiment/feature/aspect, wherein the injecting of a single phase of fluid into the porous medium in the precursor simulation comprises injecting non-wetting fluid into a porous medium containing at least wetting fluid.

8. The method of any preceding or following embodiment/feature/aspect, wherein the setting of the initial conditions comprises setting fluid properties of the wetting fluids and non-wetting fluids which comprise viscosity, contact angle, and interfacial tension thereof.

9. The method of any preceding or following embodiment/feature/aspect, wherein the fractional pressures comprise fractional pressure of wetting fluids and fractional pressure of non-wetting fluids in the porous medium, the fractional saturations comprise fractional saturation of wetting fluids and fractional saturation of non-wetting fluids in the porous medium, and the fractional velocities comprise fractional velocity of wetting fluids and fractional velocity of non-wetting fluids in the porous medium.

10. The method of any preceding or following embodiment/feature/aspect, wherein wetting and non-wetting fluids enter the porous medium through pores on an inlet face of the porous medium in the second simulation.

11. The method of any preceding or following embodiment/feature/aspect, wherein the calculating comprises computational fluid dynamics.

12. The method of any preceding or following embodiment/feature/aspect, wherein the computational fluids dynamics comprises the lattice Boltzmann method.

13. The method of any preceding or following embodiment/feature/aspect, wherein the time increment, t, used in at least one of the precursor simulation and the second simulation is seconds, milliseconds or other time unit.

14. The method of any preceding or following embodiment/feature/aspect, wherein quasi steady state is determined in the precursor simulation based on quasi-steady state wherein the saturation varies no more than a pre-determined value.

15. The method of any preceding or following embodiment/feature/aspect, wherein quasi steady state is determined in the second simulation based on quasi-steady state wherein the calculated values of $Q_n$, $Q_w$, $P_n$, $P_w$ and/or saturation vary no more than a pre-determined value.

16. The present invention also relates to a method for estimating relative permeability for fractional multi-phase, multi-component fluid flow through a porous medium comprising steps of:
    (a) creating a three dimensional digital representation of a porous medium;
    (b) performing a first or precursor simulation over a first computational domain of the three-dimensional (3D) digital representation of the porous medium, wherein the first computational domain extends from an inlet plane to an outlet plane, which comprises
        (1) selecting a storage plane located between and parallel to the inlet and outlet planes in the three-dimensional (3D) digital representation of the porous medium sample,
        (2) setting initial conditions of the precursor simulation, wherein the initial conditions comprise initial phases distribution, fluid properties, outlet pressure, and maximum time increments,
        (3) simulating injecting of single phase fluid into the inlet plane of the sample towards the storage plane and the outlet plane, (4) calculating fractional flow rates, pressures, saturations, and velocities for all points in the porous medium within the first computational domain for a time increment during the simulating of step (3), (5) determining after the calculating of step (4) if saturation at the storage plane has changed a preselected percentage amount, (6) storing the calculated saturations, pressures, and fractional velocities of the storage plane for the time increment as corresponding index values if in step (5) a preselected percentage amount of change in saturation is determined to have occurred, (7) determining after step (5) if saturation in a volume of the porous medium defined by the first computational domain is at quasi steady state, (8) repeating steps (3), (4), (5), and (6) for a successive time increment if saturation in the volume is not determined to be at quasi steady state in step (7) or ending the simulating of step (3) if quasi steady state is determined in step (7), wherein a last set of stored index values in step (6) are designated final index values; and (c) performing a second simulation over a second computational domain of the three-dimensional (3D) digital representation of the porous medium sample, wherein the second computational domain is defined by said storage plane which represents an inlet plane for second computational domain and said outlet plane used in the precursor simulation, which comprises (i) setting initial conditions for the second simulation, which comprise outlet pressure, phase distributions, maximum time increments, and the initial index values of the variables stored in the precursor simulation, (ii) simulating injecting of dual phase fluids into the porous medium from the storage plane towards the outlet plane, wherein fractions of wetting and non-wetting phases are injected according to the initial index values stored from the precursor simulation, (iii) calculating fractional flow rates, pressures, saturations, and velocities for a time increment during the simulating of step (ii), (iv) determining after step (iii) if quasi steady state is reached, (v) repeating steps (iii) and (iv) for a successive time increment if quasi steady state is not determined in step (iv), (vi) storing the fractional flow rates, pressure, and saturation values calculated in step (iii) if quasi steady state is determined in step (iv), (vii) determining after step (iv) if the final index values of the variables stored for the storage plane in the precursor simulation have been reached, (viii) repeating steps (iii), (iv), (v), and (vi) if determined in step (vii) that the final index values for the variables stored for the storage plane in the precursor simulation have not been reached, comprising using inflow conditions for the calculating in step (iii) which correspond to successively stored index values of the variables at the storage plane from the precursor simulation, and (ix) calculating relative permeability of at least one of the wetting phase and non-wetting phase if the final index values stored for the storage plane in the precursor simulation are determined to have been reached in step (vii).

17. The present invention also relates to a system for computing relative permeability for fractional multi-phase, multi-component fluid flow through a porous medium, comprising:

a) a scanner capable of producing a three dimensional digital image of a porous medium;

b) a computer comprising at least one processor operable for executing a computer program capable of classifying elements in the three dimensional digital image as solid (grain) and pore (void);

c) a computer (same or different from b)) comprising at least one processor operable for executing a computer program capable of performing computations, wherein said computations comprise (a) creating a three dimensional digital representation of the porous medium, (b) performing a first or precursor simulation over a first computational domain of the three-dimensional (3D) digital representation of the porous medium, wherein the first computational domain extends from an inlet plane to an outlet plane and a selected storage plane is located between the inlet and outlet planes, which comprises (1) setting the initial condition for the precursor simulation where the initial distribution of the fluid is single or multi-phase flow within the volume, (2) defining a nominal pressure at the outlet of the volume, (3) assessing properties of the wetting fluids and non-wetting fluids, (4) defining an inlet pressure in order to have a selected flow rate, (5) simulating injecting of single phase fluid into the inlet plane of the sample towards the storage plane and the outlet plane, (6) calculating sets of variables comprising fractional flow rates, pressures, saturations, and velocities of wetting and non-wetting phases for all points in the porous medium within the first computational domain for successive time increments, (7) determining if saturation at the storage plane has changed one of a preselected percentage amounts after the calculating done at each of the time increments of step (6), and if so, storing index values for the storage plane wherein the stored index values comprise sets of variables which comprise the saturations, and/or pressures, and/or velocities of the wetting and/or non-wetting phases of the storage plane measured for the time increment for which the determining is done, (8) determining after step (7) if saturation in a volume of the porous medium defined by the first computational domain is at quasi steady state, (9) repeating steps (5), (6), and (7) for a successive time increment if saturation in the volume is not determined to be at quasi steady state in step (8) or ending the simulating of step (5) if quasi steady state is determined in step (8), wherein a last set of stored index values in step (7) are designated final index values, (c) performing a second simulation over a second computational domain of the three-dimensional (3D) digital representation of the porous medium sample, wherein the second computational domain is defined by said storage plane which represents an inlet plane for the second computational domain and said outlet plane used in the precursor simulation, which comprises (i) setting the initial condition for the precursor simulation where the initial distribution of the fluid is single or multi-phase flow within the volume, (ii) defining a nominal pressure at the outlet of the volume, (iii) setting inlet flow conditions of the second simulation from the storage plane of the precursor simulation, wherein a first plane determines a first fractional flow injection of wetting and non-wetting fluid, (iv) simulating injecting of dual phase fluids into the inlet plane of the sample of the second simulation towards the outlet plane, wherein fractions of wetting and non-wetting phases are injected according to the saturation and pressure distribution values stored from the precursor simulation at the storage plane, beginning with initial index values of zero for the first couple of fractional flows stored in the precursor simulation, (v) calculating fractional flow rates, pressures, saturations, and velocities of the wetting and non-wetting phases for all points in the porous medium within the second computational domain for a time increment during the simulating of step (iv), (vi) determining after step (v) if quasi steady state is reached, (vii) repeating steps (v) and (vi) for a successive time increment if quasi steady state is not determined in step (vi); (viii) storing the fractional flow rates, pressures and saturations distribution calculated in step (v) if quasi steady state is determined in step (vi), (ix) determining if the final index values stored for the variables at the storage plane in the precursor simulation have been reached if quasi steady state is determined in step (vi), (x) repeating steps (v), (vi), (vii), and (viii) if determined in step (ix) that the final index values stored for the storage plane in the precursor simulation have not been reached, comprising using inflow conditions for the calculating in step (v) which correspond to successively stored index values for the variables at the storage plane from the precursor simulation, and (xi) calculating relative permeability of at least one of the wetting phase and non-wetting phase if the final index values stored for the variables at the storage plane in the precursor simulation are determined to have been reached in step (ix); and d) at least one device to display, print, or store results of the computations.

18. The system of any preceding or following embodiment/feature/aspect, wherein the scanner comprises a computer tomographic (CT) scanner, a scanning electron microscope (SEM), a focused ion bean scanning electron microscope (FIB-SEM), or similar device capable of producing a three dimensional digital image of a porous medium.

19. The system of any preceding or following embodiment/feature/aspect, wherein the device comprises a memory device for retrievably storing the results of said computations.

20. The present invention also relates to a computer program product on a computer readable medium that, when performed on a controller in a computerized device provides a method for performing the computations of any preceding or following embodiment/feature/aspect. This computer program can be on a non-transitory storage medium and/or the computer readable storage medium can exclude signals.

The present invention can include any combination of these various features or embodiments above and/or below as set forth in sentences and/or paragraphs. Any combination of disclosed features herein is considered part of the present invention and no limitation is intended with respect to combinable features.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for estimating relative permeability for fractional multi-phase, multi-component fluid flow through a porous medium comprising steps of:

(a) creating a three dimensional digital representation of a porous medium comprising scanning a sample of the porous medium using a scanning device to make an image of the porous medium and segmenting the image to produce the three dimensional digital representation of the porous medium;

(b) performing a first or precursor simulation over a first computational domain of the three-dimensional digital representation of the porous medium, wherein the first computational domain extends from an inlet plane to an outlet plane and a selected storage plane is located between the inlet and outlet planes, which comprises:
  (1) setting the initial condition for the precursor simulation where the initial distribution of the fluid is single or multi-phase flow within the volume,
  (2) defining a nominal pressure at the outlet of the volume,
  (3) assessing properties of the wetting fluids and non-wetting fluids,
  (4) defining an inlet pressure in order to have a selected flow rate,
  (5) simulating injecting of single phase fluid into the inlet plane of the sample towards the storage plane and the outlet plane,
  (6) calculating sets of variables comprising fractional flow rates, pressures, saturations, and velocities of the wetting and non-wetting phases for all points in the porous medium within the first computational domain for successive time increments,
  (7) determining if saturation at the storage plane has changed one of a preselected percentage amounts after the calculating done at each of the time increments of step (6), and if so, storing index values for the storage plane wherein the stored index values comprise sets of variables which comprise the saturations, and/or pressures, and/or velocities of the wetting and/or non-wetting phases of the storage plane measured for the time increment for which the determining is done,
  (8) determining after step (7) if saturation in a volume of the porous medium defined by the first computational domain is at quasi steady state,
  (9) repeating steps (5), (6), and (7) for a successive time increment if saturation in the volume is not determined to be at quasi steady state in step (8) or ending the simulating of step (5) if quasi steady state is determined in step (8), wherein a last set of stored index values in step (7) are designated final index values;

(c) performing a second simulation over a second computational domain of the three-dimensional digital representation of the porous medium sample, wherein the second computational domain is defined by said storage plane which represents an inlet plane for the second computational domain and said outlet plane used in the precursor simulation, which comprises
  (i) setting the initial condition for the precursor simulation where the initial distribution of the fluid is single or multi-phase flow within the volume,
  (ii) defining a nominal pressure at the outlet of the volume,
  (iii) setting inlet flow conditions of the second simulation from the storage plane of the precursor simulation, wherein a first plane determines a first fractional flow injection of wetting and non-wetting fluid,
  (iv) simulating injecting of dual phase fluids into the inlet plane of the sample of the second simulation towards the outlet plane, wherein fractions of wetting and non-wetting phases are injected according to the saturation and pressure distribution values stored from the precursor simulation at the storage plane, beginning with initial index values of zero for the first couple of fractional flows stored in the precursor simulation, (v) calculating fractional flow rates, pressures, saturations, and velocities of the wetting and non-wetting phases for all points in the porous medium within the second computational domain for a time increment during the simulating of step (iv), (vi) determining after step (v) if quasi steady state is reached, (vii) repeating steps (v) and (vi) for a successive time increment if quasi steady state is not determined in step (vi), (viii) storing the fractional flow rates, pressure, and saturations distribution calculated in step (v) if quasi steady state is determined in step (vi), (ix) determining if final index values stored for the variables at the storage plane in the precursor simulation have been reached if quasi steady state is determined in step (vi), (x) repeating steps (v), (vi), (vii), and (viii) if determined in step (ix) that the final index values stored for the storage plane in the precursor simulation have not been reached, comprising using inflow conditions for the calculating in step (v) which correspond to successively stored index values for the variables at the storage plane from the precursor simulation, and (xi) calculating relative permeability of at least one of the wetting phase and non-wetting phase if the final index values stored for the variables at the storage plane in the precursor simulation are determined to have been reached in step (ix).

2. The method of claim 1, wherein the inlet plane, storage plane, and an outlet plane are parallel to each other.

3. The method of claim 1, wherein the porous medium is rock, soil, zeolite, biological tissue, wood, cork, cement, ceramic, sand, clay, inorganic compound, organic compound, or metal.

4. The method of claim 1, wherein the segmented three-dimensional digital representation of the porous medium comprises multiple, ordered planes of voxels, wherein each of the voxels represents a pore voxel or grain voxel.

5. The method of claim 1, wherein the injecting of a single phase of fluid into the porous medium in the precursor simulation comprises injecting a wetting fluid into a porous medium containing at least non-wetting fluid.

6. The method of claim 1, wherein the injecting of a single phase of fluid into the porous medium in the precursor simulation comprises injecting water or brine into the porous medium.

7. The method of claim 1, wherein the injecting of a single phase of fluid into the porous medium in the precursor simulation comprises injecting non-wetting fluid into a porous medium containing at least wetting fluid.

8. The method of claim 1, wherein the setting of the initial conditions comprises setting fluid properties of the wetting fluids and non-wetting fluids which comprise viscosity, contact angle, and interfacial tension thereof.

9. The method of claim 1, wherein the fractional pressures comprise fractional pressure of wetting fluids and fractional pressure of non-wetting fluids in the porous medium, the fractional saturations comprise fractional saturation of wetting fluids and fractional saturation of non-wetting fluids in the porous medium, and the fractional velocities comprise fractional velocity of wetting fluids and fractional velocity of non-wetting fluids in the porous medium.

10. The method of claim 1, wherein wetting and non-wetting fluids enter the porous medium through pores on an inlet face of the porous medium in the second simulation.

11. The method of claim 1, wherein the calculating comprises computational fluid dynamics.

12. The method of claim 11, wherein the computational fluids dynamics comprises the lattice Boltzmann method.

13. The method of claim 1, wherein the time increment, t, used in at least one of the precursor simulation and the second simulation is seconds, milliseconds or other time unit.

14. The method of claim 1, wherein quasi steady state is determined in the precursor simulation based on quasi-steady state wherein the saturation varies no more than a pre-determined value.

15. The method of claim 1, wherein quasi steady state is determined in the second simulation based on quasi-steady state wherein the calculated values of Qn, Qw, Pn, Pw and/or saturation vary no more than a pre-determined value.

16. A computer program product on a non-transitory computer readable medium that, when performed on a controller in a computerized device provides a method for performing the computations of claim 1.

17. A method for estimating relative permeability for fractional multi-phase, multi-component fluid flow through a porous medium comprising steps of:

(a) creating a three dimensional digital representation of a porous medium comprising scanning a sample of the porous medium using a scanning device to make an image of the porous medium and segmenting the image to produce the three dimensional digital representation of the porous medium;

(b) performing a first or precursor simulation over a first computational domain of the three-dimensional digital representation of the porous medium, wherein the first computational domain extends from an inlet plane to an outlet plane, which comprises (1) selecting a storage plane located between and parallel to the inlet and outlet planes in the three-dimensional digital representation of the porous medium sample, (2) setting initial conditions of the precursor simulation, wherein the initial conditions comprise initial phases distribution, fluid properties, outlet pressure, and maximum time increments, (3) simulating injecting of single phase fluid into the inlet plane of the sample towards the storage plane and the outlet plane, (4) calculating fractional flow rates, pressures, saturations, and velocities for all points in the porous medium within the first computational domain for a time increment during the simulating of step (3), (5) determining after the calculating of step (4) if saturation at the storage plane has changed a preselected percentage amount, (6) storing the calculated saturations, pressures, and fractional velocities of the storage plane for the time increment as corresponding index values if in step (5) a preselected percentage amount of change in saturation is determined to have occurred, (7) determining after step (5) if saturation in a volume of the porous medium defined by the first computational domain is at quasi steady state, (8) repeating steps (3), (4), (5), and (6) for a successive time increment if saturation in the volume is not determined to be at quasi steady state in step (7) or ending the simulating of step (3) if quasi steady state is determined in step (7), wherein a last set of stored index values in step (6) are designated final index values; and (c) performing a second simulation over a second computational domain of the three-dimensional digital representation of the porous medium sample, wherein the second computational domain is defined by said storage plane which represents an inlet plane for the second computational domain and said outlet plane used in the precursor simulation, which comprises
   (i) setting initial conditions for the second simulation, which comprise outlet pressure, phase distributions, maximum time increments, and the initial index values stored in the precursor simulation,
   (ii) simulating injecting of dual phase fluids into the porous medium from the storage plane towards the outlet plane, wherein fractions of wetting and non-wetting phases are injected according to the initial index values of the variables stored from the precursor simulation,
   (iii) calculating fractional flow rates, pressures, saturations, and velocities for a time increment during the simulating of step (ii),
   (iv) determining after step (iii) if quasi steady state is reached,
   (v) repeating steps (iii) and (iv) for a successive time increment if quasi steady state is not determined in step (iv),
   (vi) storing the fractional flow rates, pressure, and saturations calculated in step (iii) if quasi steady state is determined in step (iv),
   (vii) determining after step (iv) if the final index values of the variables stored for the storage plane in the precursor simulation have been reached,
   (viii) repeating steps (iii), (iv), (v), and (vi) if determined in step (vii) that the final index values for the variables stored for the storage plane in the precursor simulation have not been reached, comprising using inflow conditions for the calculating in step (iii) which correspond to successively stored index values of the variables the storage plane from the precursor simulation, and
   (ix) calculating relative permeability of at least one of the wetting phase and non-wetting phase if the final index values stored for the storage plane in the precursor simulation are determined to have been reached in step (vii).

18. A system for computing relative permeability for fractional multi-phase, multi-component fluid flow through a porous medium comprising:
   a) a scanner capable of producing a three dimensional digital image of a porous medium;
   b) a computer comprising at least one processor operable for executing a computer program capable of classifying elements in the three dimensional digital image as grain and void;
   c) a computer (same or different from b)) comprising at least one processor operable for executing a computer program capable of performing computations, wherein said computations comprise (a) creating a three dimensional digital representation of the porous medium, (b) performing a first or precursor simulation over a first computational domain of the three-dimensional digital representation of the porous medium, wherein the first computational domain extends from an inlet plane to an outlet plane and a selected storage plane is located between the inlet and outlet planes, which comprises (1) setting the initial condition for the precursor simulation where the initial distribution of the fluid is single or multi-phase flow within the volume, (2) defining a nominal pressure at the outlet of the volume, (3) assessing properties of the wetting fluids and non-wetting fluids, (4) defining an inlet pressure in order to have a selected flow rate, (5) simulating injecting of single phase fluid into the inlet plane of the sample towards the storage plane and the outlet plane, (6) calculating sets of variables comprising fractional flow rates, pressures, saturations, and velocities of wetting and non-wetting phases for all points in the porous medium within the first computational domain for successive time increments, (7) determining if saturation at the storage plane has changed one of a preselected percentage amounts after the calculating done at each of the time increments of step (6), and if so, storing index values for the storage plane wherein the stored index values comprise sets of variables which comprise the saturations, and/or pressures, and/or velocities of the wetting and/or non-wetting phases of the storage plane measured for the time increment for which the determining is done, (8) determining after step (7) if saturation in a volume of the porous medium defined by the first computational domain is at quasi steady state, (9) repeating steps (5), (6), and (7) for a successive time increment if saturation in the volume is not determined to be at quasi steady state in step (8) or ending the simulating of step (5) if quasi steady state is determined in step (8), wherein a last set of stored index values in step (7) are designated final index values, (c) performing a second simulation over a second computational domain of the three-dimensional digital representation of the porous medium sample, wherein the second computational domain is defined by said storage plane which represents an inlet plane for the second computational domain and said outlet plane used in the precursor simulation, which comprises (i) setting the initial condition for the precursor simulation where the initial distribution of the fluid is single or multi-phase flow within the volume, (ii) defining a nominal pressure at the outlet of the volume, (iii) setting inlet flow conditions of the second simulation from the storage plane of the precursor simulation, wherein a first plane determines a first fractional flow injection of wetting and non-wetting fluid, (iv) simulating injecting of dual phase fluids into the inlet plane of the sample of the second simulation towards the outlet plane, wherein fractions of wetting and non-wetting phases are injected according to the saturation and pressure distribution values stored from the precursor simulation at the storage plane, beginning with initial index values of zero for the first couple of fractional flows stored in the precursor simulation, (v) calculating fractional flow rates, pressures, saturations, and velocities of the wetting and non-wetting phases for all points in the porous medium within the second computational domain for a time increment during the simulating of step (iv), (vi) determining after step (v) if quasi steady state is reached, (vii) repeating steps (v) and (vi) for a successive time increment if quasi steady state is not determined in step (vi); (viii) storing the fractional flow rates, pressures and saturations distribution calculated in step (v) if quasi steady state is determined in step (vi), (ix) determining if the final index values stored for the variables at the storage plane in the precursor simulation have been reached if quasi steady state is determined in step (vi), (x) repeating steps (v), (vi), (vii), and (viii) if determined in step (ix) that the final index values stored for the storage plane in the precursor simulation have not been reached, comprising using inflow conditions for the calculating in step (v) which correspond to successively stored index values for the variables at the storage plane from the precursor simulation, and (xi) calculating relative permeability of at least one of the wetting phase and non-wetting phase if the final index values stored for the variables at the storage plane in the precursor simulation are determined to have been reached in step (ix); and d) at least one device to display, print, or store results of the computations.

19. The system of claim 18, wherein the scanner comprises a computer tomographic (CT) scanner, a scanning electron microscope (SEM), a focused ion bean scanning electron microscope (FIB-SEM), or similar device capable of producing a three dimensional digital image of a porous medium.

20. The system of claim 18, wherein the device comprises a memory device for retrievably storing the results of said computations.

* * * * *